(12) United States Patent
Fukagawa et al.

(10) Patent No.: US 11,613,596 B2
(45) Date of Patent: Mar. 28, 2023

(54) COMPOSITION, OPTICAL FILM, POLARIZING PLATE, DISPLAY DEVICE, AND METHOD FOR PRODUCING COMPOSITION

(71) Applicant: FUJIFILM Corporation, Tokyo (JP)

(72) Inventors: Reiko Fukagawa, Kanagawa (JP); Akio Tamura, Kanagawa (JP); Taketo Otani, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 384 days.

(21) Appl. No.: 16/712,030

(22) Filed: Dec. 12, 2019

(65) Prior Publication Data

US 2020/0115480 A1    Apr. 16, 2020

Related U.S. Application Data

(63) Continuation of application No. PCT/JP2018/021992, filed on Jun. 8, 2018.

(30) Foreign Application Priority Data

Jun. 30, 2017 (JP) .............................. JP2017-129821

(51) Int. Cl.
| | | |
|---|---|---|
| C08F 220/22 | (2006.01) | |
| G02B 5/30 | (2006.01) | |
| C08F 220/24 | (2006.01) | |
| G02F 1/1335 | (2006.01) | |
| G02B 1/14 | (2015.01) | |

(52) U.S. Cl.
CPC .......... *C08F 220/22* (2013.01); *C08F 220/24* (2013.01); *G02B 1/14* (2015.01); *G02B 5/305* (2013.01); *G02F 1/133528* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,095,141 | B2 * | 8/2015 | Carlson | C09D 5/1612 |
| 9,200,175 | B2 * | 12/2015 | Chang | C09D 133/14 |
| 11,078,314 | B2 * | 8/2021 | Fukagawa | C08F 214/184 |
| 2006/0106178 | A1 * | 5/2006 | Destarac | C08F 4/00 526/279 |
| 2012/0135206 | A1 * | 5/2012 | Haraguchi | C09D 4/06 525/200 |
| 2013/0337161 | A1 * | 12/2013 | Akimoto | C09C 1/309 522/170 |
| 2014/0308503 | A1 * | 10/2014 | Tamura | C08J 5/18 525/379 |
| 2015/0361238 | A1 * | 12/2015 | Sugimoto | C08L 25/06 521/139 |
| 2016/0068756 | A1 | 3/2016 | Moriya et al. | |
| 2016/0327711 | A1 | 11/2016 | Ishiguro et al. | |
| 2018/0117888 | A1 | 5/2018 | Fukagawa et al. | |
| 2018/0201797 | A1 * | 7/2018 | Taniguchi | C08F 230/085 |
| 2019/0092899 | A1 | 3/2019 | Tamura et al. | |
| 2019/0218460 | A1 | 7/2019 | Suzuki et al. | |

FOREIGN PATENT DOCUMENTS

| | | | | |
|---|---|---|---|---|
| JP | 05-156056 | A | 6/1993 | |
| JP | 2000-102727 | A | 4/2000 | |
| JP | 2004-051790 | A | 2/2004 | |
| JP | 2004-163610 | A | 6/2004 | |
| JP | 2008-225281 | A | 9/2008 | |
| JP | 2012-001590 | A | 1/2012 | |
| JP | WO2012074076 | A1 * | 6/2012 | |
| JP | 2015-091927 | A | 5/2015 | |
| JP | 2015-102813 | A | 6/2015 | |
| JP | 2016-051178 | A | 4/2016 | |
| JP | 2016-150996 | A | 8/2016 | |
| JP | 2016-167417 | A | 9/2016 | |
| KR | 101576295 | B1 * | 12/2015 | |
| TW | 201531551 | A | 8/2015 | |
| WO | WO-9221492 | A1 * | 12/1992 | ....... B32B 17/10018 |
| WO | WO-2005111124 | A1 * | 11/2005 | ................ C08J 5/18 |
| WO | 2014/021852 | A1 | 2/2014 | |
| WO | 2015/111547 | A1 | 7/2015 | |
| WO | 2017/002847 | A | 1/2017 | |
| WO | WO-2017051922 | A1 * | 3/2017 | .............. C08F 20/18 |
| WO | 2018/003662 | A1 | 1/2018 | |
| WO | 2018/062068 | A1 | 4/2018 | |

OTHER PUBLICATIONS

Office Action, issued by the Japanese Patent Office dated Jun. 2, 2020, in connection with Japanese Patent Application No. 2019-526761.
Office Action, issued by the State Intellectual Property Office dated Apr. 6, 2021, in connection with Chinese Patent Application No. 201880043005.9.
Office Action, issued by the State Intellectual Property Office dated Aug. 5, 2021, in connection with Chinese Patent Application No. 201880043005.9.
International Search Report issued in PCT/JP2018/021992 dated Sep. 11, 2018.
Written Opinion issued in PCT/JP2018/021992 dated Sep. 11, 2018.

(Continued)

*Primary Examiner* — Nicole M. Buie-Hatcher
(74) *Attorney, Agent, or Firm* — Edwards Neils LLC; Jean C. Edwards, Esq.

(57) ABSTRACT

A fluorine-containing copolymer composition includes repeating units derived from a fluorine-containing monomer represented by Formula (I) and from a monomer having at least two polymerizable groups, in which the latter is 3% by mass or more with respect to a total mass of the fluorine-containing copolymer, and the former is 15% by mass or more with respect to a total solid content in the composition, in the Formula (I), $R^1$ represents a hydrogen atom or an alkyl group having 1 to 20 carbon atoms; $R^2$ represents a group having at least one fluorine atom; and $L_1$ represents a divalent linking group including at least one selected from the group consisting of —O—, —(C=O)O—, —O(C=O)—, —(C=O)NH—, —NH(C=O)—, a divalent aromatic group which may have a substituent, a divalent aliphatic chain group which may have a substituent, and a divalent aliphatic cyclic group which may have a substituent.

12 Claims, No Drawings

(56) References Cited

OTHER PUBLICATIONS

International Preliminary Report on Patentability completed by WIPO dated Dec. 31, 2019, in connection with International Patent Application No. PCT/JP2018/021992.
Office Action, issued by the Korean Intellectual Property Office dated Oct. 19, 2020, in connection with Korean Patent Application No. 10-2019-7037100.

* cited by examiner

COMPOSITION, OPTICAL FILM, POLARIZING PLATE, DISPLAY DEVICE, AND METHOD FOR PRODUCING COMPOSITION

CROSS-REFERENCE TO RELATED APPLICATIONS

This is a continuation of International Application No. PCT/JP2018/021992 filed on Jun. 8, 2018, which was published under Article 21(2) in Japanese, and which claims priority under 35 U.S.C. § 119(a) from Japanese Patent Application No. 2017-129821 filed on Jun. 30, 2017. The above applications are hereby expressly incorporated by reference, in their entirety, into the present application.

BACKGROUND OF THE INVENTION

1. Field of the Invention

The present invention relates to a composition, an optical film, a polarizing plate, a display device, and a method for producing a composition.

2. Description of the Related Art

A fluorine-containing copolymer has useful properties and is used in various fields as a coating film surface modifier.

For example, JP2016-150996A discloses that a paint composition for a release film including a fluorine-containing copolymer having a constitutional unit based on fluoroolefin and a constitutional unit based on a monomer having at least one crosslinkable group selected from the group consisting of a hydroxyl group, a carboxyl group, an alkoxysilyl group, and an isocyanate group, and a cured film having a crosslinked structure can be formed by applying this paint composition for a release film to a substrate and curing the composition.

In addition, JP2000-102727A, JP2012-001590A, and JP2015-091927A disclose compositions including a fluorine-containing copolymer having a crosslinked structure.

SUMMARY OF THE INVENTION

However, in the technique disclosed in JP2016-150996A, in order to cure a paint composition including a fluorine-containing copolymer after applying the paint composition to a substrate, it is necessary to introduce a device or the like for maintaining a high temperature for a long period of time, and there is a problem of requiring a great production cost.

In addition, as a result of investigations conducted by the present inventors, in a case where a film is formed without curing the paint composition including the fluorine-containing copolymer described in JP2016-150996A, it is found that the film has insufficient adhesiveness with other layers. Further, it is found that the films obtained by applying and drying the compositions including the fluorine-containing copolymer having a crosslinked structure described in JP2000-102727A, JP2012-001590A, and JP2015-091927A also have insufficient adhesiveness with other layers.

In consideration of the above problem, an object of the present invention, that is, the problem to be solved by the present invention, is to provide a composition that can be produced under mild conditions and is capable of forming a film having excellent adhesiveness with other layers, films, or other articles. Another object thereof is to provide an optical film having a film formed of the composition, a polarizing plate, a display device, and a method for producing the composition.

The present inventors have conducted intensive investigations and have found that the above objects can be achieved by the following means.

<1> A composition comprising: a fluorine-containing copolymer comprising a repeating unit derived from a fluorine-containing monomer represented by the following Formula (I) and a repeating unit derived from a monomer having at least two polymerizable groups, in which a content of the repeating unit derived from a monomer having at least two polymerizable groups is 3% by mass or more with respect to a total mass of the fluorine-containing copolymer, and a content of the fluorine-containing copolymer is 15% by mass or more with respect to a total solid content in the composition.

In Formula (I), $R^1$ represents a hydrogen atom or an alkyl group having 1 to 20 carbon atoms, $R^2$ represents a group having at least one fluorine atom, and $L_1$ represents a divalent linking group comprising at least one selected from the group consisting of —O—, —(C=O)O—, —O(C=O)—, —(C=O)NH—, —NH(C=O)—, a divalent aromatic group which may have a substituent, a divalent aliphatic chain group which may have a substituent, and a divalent aliphatic cyclic group which may have a substituent.

<2> The composition according to <1>, in which the monomer having at least two polymerizable groups is a monomer represented by the following Formula (II).

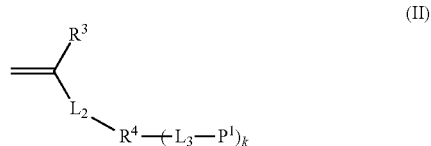

In Formula (II), $R^3$ represents a hydrogen atom or an alkyl group having 1 to 20 carbon atoms, $L_2$ represents a divalent linking group comprising at least one selected from the group consisting of —O—, —(C=O)O—, —O(C=O)—, —C(=O)NH—, —NH(C=O)—, a divalent aromatic group which may have a substituent, a divalent aliphatic chain group which may have a substituent, and a divalent aliphatic cyclic group which may have a substituent, $R^4$ represents a single bond or a (k+1)-valent linking group, k represents an integer of 1 to 7, $L_3$ represents a single bond or a divalent linking group, and $P^1$ represents a vinyl group, a vinyl ether group, an acryloyl group, a methacryloyl group, an acrylamide group, a methacrylamide group, or a styryl group. However, in a case where k represents an integer of 2 or greater, a plurality of $L_3$'s may be the same as or different from each other, and a plurality of $P^1$'s may be the same as or different from each other.

<3> The composition according to <1> or <2>, in which a weight-average molecular weight of the fluorine-containing copolymer is 20,000 or more.

<4> The composition according to any one of <1> to <3>, in which the content of the repeating unit derived from a monomer having at least two polymerizable groups is 30% by mass or more with respect to the total mass of the fluorine-containing copolymer.

<5> The composition according to any one of <1> to <4>, in which the fluorine-containing copolymer further comprises a repeating unit derived from a monomer represented by the following Formula (III).

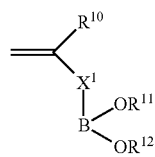

(III)

In Formula (III), $R^{10}$ represents a hydrogen atom or an alkyl group having 1 to 20 carbon atoms, $R^{11}$ and $R^{12}$ each independently represent a hydrogen atom, an aliphatic hydrocarbon group which may have a substituent, an aryl group which may have a substituent, or a heteroaryl group which may have a substituent, and $R^{11}$ and $R^{12}$ may be linked to each other. $X^1$ represents a divalent linking group.

<6> The composition according to any one of <1% to <5>, in which the fluorine-containing monomer represented by Formula (I) is a fluorine-containing monomer represented by the following Formula (IV).

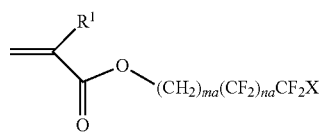

(IV)

In Formula (IV), $R^1$ represents a hydrogen atom or an alkyl group having 1 to 20 carbon atoms, ma and na each independently represent an integer of 1 to 20, and X represents a hydrogen atom or a fluorine atom.

<7> The composition according to <6>, in which the ma represents 1 or 2, and the na represents an integer of 1 to 6.

<8> An optical film comprising: a film formed of the composition according to any one of <1% to <7>.

<9> A polarizing plate comprising, in the following order: a polarizer; an adhesive layer; and the optical film according to <8>.

<10> The polarizing plate according to <9>, in which the adhesive contains a resin having a hydroxyl group.

<11> A display device comprising: the polarizing plate according to <9> or <10>.

<12> A method for producing a composition comprising: obtaining a fluorine-containing copolymer by polymerizing a fluorine-containing monomer represented by the following Formula (I) and a monomer having at least two polymerizable groups; and producing a composition containing the fluorine-containing copolymer, in which a content of the repeating unit derived from a monomer having at least two polymerizable groups is 3% by mass or more with respect to a total mass of the fluorine-containing copolymer, and a content of the fluorine-containing copolymer is 15% by mass or more with respect to a total solid content in the composition.

(I)

In Formula (I), $R^1$ represents a hydrogen atom or an alkyl group having 1 to 20 carbon atoms, $R^2$ represents a group having at least one fluorine atom, and $L_1$ represents a divalent linking group comprising at least one selected from the group consisting of —O—, —(C=O)O—, —O(C=O)—, —(C=O)NH—, —NH(C=O)—, a divalent aromatic group which may have a substituent, a divalent aliphatic chain group which may have a substituent, and a divalent aliphatic cyclic group which may have a substituent.

According to the present invention, it is possible to provide a composition that can be produced under mild conditions and is capable of forming a film having excellent adhesiveness with other layers, films, or other articles. In addition, it is also possible to provide an optical film having a film formed of the composition, a polarizing plate, a display device, and a method for producing the composition.

DESCRIPTION OF THE PREFERRED EMBODIMENTS

Hereinafter, the present invention will be described in detail.

The numerical range which is shown by "to" used in the present specification means the range including the numerical values described before and after "to" as the lower limit and the upper limit, respectively.

In the present specification, the term "(meth)acrylate" is used as a term meaning "either or both of methacrylate and acrylate". The same applies to "(meth)acrylic group", "(meth)acrylic acid", "(meth)acrylamide", "(meth)acryloyl group", "(meth)acrylic" and the like.

[Composition]

A composition according to an embodiment of the present invention is a composition including a fluorine-containing copolymer having a repeating unit derived from a fluorine-containing monomer represented by Formula (I); and a repeating unit derived from a monomer having at least two polymerizable groups, a content of the repeating unit derived from a monomer having at least two polymerizable groups is 3% by mass or more with respect to a total mass of the fluorine-containing copolymer, and a content of the fluorine-containing copolymer is 15% by mass or more with respect to a total solid content (all components excluding a solvent) in the composition.

(I)

In Formula (I), $R^1$ represents a hydrogen atom or an alkyl group having 1 to 20 carbon atoms, $R^2$ represents a group having at least one fluorine atom, and $L_1$ represents a divalent linking group including at least one selected from the group consisting of —O—, —(C=O)O—, —O(C=O)—, —(C=O)NH—, —NH(C=O)—, a divalent aromatic group which may have a substituent, a divalent aliphatic chain group which may have a substituent, and a divalent aliphatic cyclic group which may have a substituent.

in a case where a film formed of the composition according to the embodiment of the present invention (hereinafter, also referred to as "film according to the embodiment of the present invention") is bonded to other layers, films, and other articles (hereinafter, also referred to as "other layers and the like"), the fluorine-containing copolymer included in the film according to the embodiment of the present invention can be unevenly distributed on the surface of the film according to the embodiment of the present invention by the action of the repeating unit derived from a fluorine-containing monomer represented by Formula (I). In addition, the fluorine-containing copolymer in the present invention has a structure (crosslinked structure) in which a polymer chain having the repeating unit derived from the fluorine-containing monomer represented by Formula (I) is crosslinked due to the presence of the repeating unit derived from the monomer having at least two polymerizable groups. It is considered that since the film highly crosslinked is formed by the repeating unit derived from the monomer having at least two polymerizable groups in the fluorine-containing copolymer, the adhesiveness between the film according to the embodiment of the present invention, other layers and the like can be improved. Particularly, in a case where the film according to the embodiment of the present invention is prepared together with other resins (in a case where the composition according to the embodiment of the present invention includes other resins), it is considered that the entanglement with other resins is large, the release of the fluorine-containing copolymer from the film surface can be reduced, and further excellent adhesiveness can be obtained. In the present invention, it is considered that sufficient adhesiveness can be realized by containing the fluorine-containing copolymer in an amount of 15% by mass or more with respect to the total solid content in the composition. Further, since the fluorine-containing copolymer included in the composition according to the embodiment of the present invention has 3% by mass or more of the repeating unit derived from the monomer having at least two monomers, it is not necessary to perform a curing step of heating the coating film at a high temperature for a long period of time after application, or the like, and the film according to the embodiment of the present invention can be produced under mild conditions.

Hereinafter, the fluorine-containing copolymer having the repeating unit derived from the fluorine-containing monomer represented by Formula (I) and the repeating unit derived from a monomer having at least two polymerizable groups is also referred to as "copolymer (a)".

<Copolymer (a)>

The copolymer (a) is a fluorine-containing copolymer having the repeating unit derived from the fluorine-containing monomer represented by Formula (I) and the repeating unit derived from a monomer having at least two polymerizable groups.

(Repeating Unit Derived from Fluorine-Containing Monomer Represented By Formula (I))

First, the repeating unit derived from the fluorine-containing monomer represented by Formula (I) will be described.

The repeating unit derived from the fluorine-containing monomer represented by Formula (I) is a repeating unit obtained by a reaction of an ethylenically unsaturated double bond in Formula (I) and is a repeating unit represented by Formula (PI).

(PI)

In Formula (PI), $R^1$, $R^2$, and $L_1$ are the same as $R^1$, $R^2$, and $L_1$ in Formula (I), respectively.

In Formula (I), $R^1$ represents a hydrogen atom or an alkyl group having 1 to 20 carbon atoms, preferably represents a hydrogen atom or an alkyl group having 1 to 10 carbon atoms, more preferably represents a hydrogen atom or an alkyl group having 1 to 4 carbon atoms, and even more preferably represents a hydrogen atom or a methyl group.

In Formula (I), $R^2$ represents a group having at least one fluorine atom, preferably represents an alkyl group having at least one fluorine atom as a substituent (fluoroalkyl group), more preferably represents a fluoroalkyl group having 1 to 20 carbon atoms, even more preferably represents a fluoroalkyl group having 1 to 18 carbon atoms, and particularly preferably represents a fluoroalkyl group having 2 to 15 carbon atoms. In addition, the number of fluorine atoms in the fluoroalkyl group is preferably 1 to 25, more preferably 3 to 21, and most preferably 5 to 21.

In Formula (I), $L_1$ represents a divalent linking group including at least one selected from the group consisting of —O—, —(C=O)O—, —O(C=O)—, —(CO)NH—, —NH(C=O)—, a divalent aromatic group which may have a substituent, a divalent aliphatic chain group which may have a substituent, and a divalent aliphatic cyclic group which may have a substituent.

Regarding $L_1$ in Formula (I), —(C=O)O— represents that C=O is bonded on the $R^1$ side and O is bonded on the $R^2$ side. —O(C=O)— represents that O is bonded on the $R^1$ side and C=O is bonded on the $R^2$ side. —(C=O)NH— represents that C=O is bonded on the $R^1$ side and NH is bonded on the $R^2$ side. —NH(C=O)— represents that NH is bonded on the $R^1$ side and C=O is bonded on the $R^2$ side.

The divalent aromatic group may be a divalent aromatic hydrocarbon group or a divalent aromatic heterocyclic group, is preferably a divalent aromatic group having 5 to 12 carbon atoms, and more preferably a divalent aromatic group having 6 to 8 carbon atoms.

The divalent aliphatic chain group is preferably an alkylene group having 1 to 20 carbon atoms and more preferably an alkylene group having 1 to 10 carbon atoms.

The divalent aliphatic cyclic group is preferably a cycloalkylene group having 3 to 20 carbon atoms and more preferably a cycloalkylene group having 3 to 15 carbon atoms.

The divalent aromatic group, the divalent aliphatic chain group, and the divalent aliphatic cyclic group may respectively have a substituent. Examples of preferable substituents include a halogen atom, a hydroxyl group, a carboxyl group, an amino group, an alkyl group having 1 to 6 carbon atoms, and an alkenyl group having 1 to 6 carbon atoms. From the viewpoint of ease of synthesis, the groups preferably have no substituent.

$L_1$ is preferably —(C=O)O— or —O(C=O)— and more preferably —(C=O)O—.

From the viewpoint of surface uneven distribution advantageous for adhesiveness and from the viewpoint of radical polymerization, it is preferable that the fluorine-containing monomer represented by Formula (I) is particularly preferably a fluorine-containing monomer represented by Formula (IV).

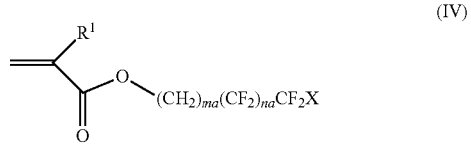

(IV)

In Formula (IV), $R^1$ represents a hydrogen atom or an alkyl group having 1 to 20 carbon atoms, ma and na each independently represent an integer of 1 to 20, and X represents a hydrogen atom or a fluorine atom.

In Formula (IV), $R^1$ is the same as $R^1$ in Formula (I), and the preferable range thereof is also the same.

In Formula (IV), ma and na each independently represent an integer of 1 to 20.

From the viewpoint of surface uneven distribution advantageous for adhesiveness and from the viewpoint of ease of material availability and production, ma in Formula (IV) is preferably an integer of 1 to 8, more preferably an integer of 1 to 5, and even more preferably 1 or 2. In addition, na is preferably an integer of 1 to 8 and more preferably an integer of 1 to 6.

It is particularly preferable that ma represents 1 or 2 and na represents an integer of 1 to 6.

In Formula (IV), X represents a hydrogen atom or a fluorine atom and preferably represents a fluorine atom.

Examples of the fluorine-containing monomer represented by Formula (I) or (IV) include 2,2,2-trifluoroethyl (meth)acrylate, 2,2,3,3,3-tetrafluoropropyl (meth)acrylate, 2-(perfluorobutyl)ethyl (meth)acrylate, 2-(perfluorohexyl) ethyl (meth)acrylate, 2-(perfluorooctyl)ethyl (meth)acrylate, 2-(perfluorodecyl)ethyl (meth)acrylate, 2-(perfluoro-3-methylbutyl)ethyl (meth)acrylate, 2-(perfluoro-5-methylhexy)ethyl (meth)acrylate, 2-(perfluoro-7-methyloctyl)ethyl (meth)acrylate, 1H,1H,3H-tetrafluoropropyl (meth)acrylate, 1H,1H,5H-octafluoropentyl (meth)acrylate, 1H,1H,7H-dodecafluoroheptyl (meth)acrylate, 1H,1H,9H-hexadecafluorononyl (meth)acrylate, 1H-1-(trifluoromethyl)trifluoroethyl (meth)acrylate, 1H,1H,3H-hexafluorobutyl (meth)acrylate, 3-perfluorobutyl-2-hydroxypropyl (meth)acrylate, 3-perfluorohexyl-2-hydroxypropyl (meth)acrylate, 3-perfluorooctyl-2-hydroxypropyl (meth)acrylate, 3-(perfluoro-3-methylbutyl)-2-hydroxypropyl (meth)acrylate, 3-(perfluoro-5-methylhexyl)-2-hydroxypropyl (meth)acrylate, and 3-(perfluoro-7-methyloctyl)-2-hydroxypropyl (meth)acrylate.

(Repeating Unit Derived from Monomer Having at Least Two Polymerizable Groups)

Next, the repeating unit derived from a monomer having at least two polymerizable groups will be described.

The copolymer (a) has the repeating unit derived from a monomer having at least two polymerizable groups, and the fluorine-containing copolymer in the present invention has a structure (crosslinked structure) in which a polymer chain having the repeating unit derived from the fluorine-containing monomer represented by Formula (I) is crosslinked due to the presence of the repeating unit.

Hereinafter, the monomer having at least two polymerizable groups is also referred to as "polyfunctional monomer".

The polymerizable group of the polyfunctional monomer is preferably a group having ethylenically unsaturated double bond, is more preferably at least one selected from the group consisting of a vinyl group, a vinyl ether group, an acryloyl group, a methacryloyl group, an acrylamide group, a methacrylamide group, and a styryl group, and is even more preferably at least one selected from the group consisting of an acryloyl group and a methacryloyl group.

The number of polymerizable group of the polyfunctional monomer is not particularly limited and From the viewpoint of solubility in a solvent, the number of polymerizable groups in one molecule of the polyfunctional monomer is preferably 2 to 8, more preferably 2 to 6, even more preferably 2 to 4, particularly preferably 2 or 3, and most preferably 2.

The molecular weight of the polyfunctional monomer is not particularly limited, and the polyfunctional monomer may be a low molecular weight monomer or a high molecular weight monomer. In a case where the polyfunctional monomer is a high molecular weight monomer, although the high molecular weight monomer is not particularly limited, examples thereof include a monomer obtained by modifying polyethylene glycol with a plurality of (meth)acrylates and a monomer obtained by modifying polypropylene glycol with a plurality of (meth)acrylates.

The molecular weight of the polyfunctional monomer is preferably 50 to 1,500, more preferably 100 to 1,000, and most preferably 200 to 600. By setting the molecular weight in this range, a copolymer having excellent solubility in a solvent can be obtained.

The polyfunctional monomer is preferably a monomer represented by Formula (II).

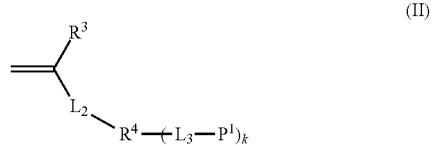

(II)

In Formula (II), $R^3$ represents a hydrogen atom or an alkyl group having 1 to 20 carbon atoms, $L_2$ represents a divalent linking group including at least one selected from the group consisting of —O—, —(C=O)O—, —O(C=O)—, —(C=O)NH—, —NH(C=O)—, a divalent aromatic group which may have a substituent, a divalent aliphatic chain group which may have a substituent, and a divalent aliphatic cyclic group which may have a substituent, $R^4$ represents a single bond or a (k+1)-valent linking group, k represents an integer of 1 to 7, $L_3$ represents a single bond or a divalent linking group, and $P^1$ represents a vinyl group, a vinyl ether group, an acryloyl group, a methacryloyl group, an acrylamide group, a methacrylamide group, or a styryl group. However, in a case where k represents an integer of 2 or greater, a plurality of $L_3$'s may be the same as or different from each other, and a plurality of $P^1$'s may be the same as or different from each other.

The repeating unit derived from the monomer having at least two polymerizable groups is a repeating unit obtained by a reaction of the polymerizable groups of the monomer having at least two polymerizable groups, and for example, in a case where the monomer having at least two polymerizable groups is a monomer represented by Formula (II), k represents 1, and $P^2$ represents an acryloyl group, the repeating unit is a repeating unit represented by Formula (PII).

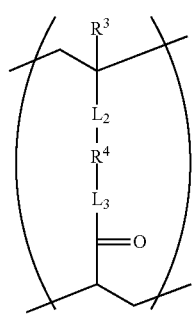

(PII)

In Formula (PII), $R^3$, $L_2$, $R^4$, and $L_3$ are the same as $R^3$, $L_2$, $R^4$, and $L_3$ in Formula (II), respectively.

$R^3$ in Formula (II) is the same as $R^1$ in Formula (I), and the preferable range thereof is also the same.

$L_2$ in Formula (II) is the same as $L_1$ in Formula (I), and the preferable range thereof is also the same. Regarding $L_2$ in Formula (II), —(C=O)O— represents that C=O is bonded on the $R^3$ side and O is bonded on the $R^4$ side. —(C=O)— represents that O is bonded on the $R^3$ side and C=O is bonded on the $R^4$ side. —(C=O)NH— represents that C=O is bonded on the $R^3$ side and NH is bonded on the $R^4$ side. —NH(C=O)— represents that NH is bonded on the $R^3$ side and C=O is bonded on the $R^4$ side.

$R^4$ in Formula (II) represents a single bond or a (k+1)-valent linking group.

In a case where $R^4$ represents a (k+1)-valent linking group, the linking group is preferably a linking group including at least one selected from the group consisting of —O—, —(C=O)—, —NH—, a hydrocarbon group which may have a substituent, and a heterocyclic group which may have a substituent.

As the hydrocarbon group, an aromatic group (preferably having 6 to 20 carbon atoms), an aliphatic chain group (preferably having 6 to 20 carbon atoms), or an aliphatic cyclic group is preferable, and an aliphatic cyclic group is more preferable.

As the heterocyclic group, a heterocyclic group having 5 to 9 carbon atoms is preferable, and specifically, an isocyanurate ring group, an imidazole group or a pyridine group is preferable.

From the viewpoint of controlling peelability between the film and the substrate (preferably the substrate film), $R^4$ is preferably a linking group including an aliphatic cyclic group. The aliphatic cyclic group is preferably a group derived from an alicyclic compound having 7 or more carbon atoms (a group formed by removing a hydrogen atom), and is more preferably a group derived from an alicyclic compound having 10 or more carbon atoms.

The aliphatic cyclic group is particularly preferably a group derived from a polycyclic compound such as a bicyclic or tricyclic compound.

More preferable are the central skeleton of a compound described in claims of JP2006-215096A, the central skeleton of a compound described in JP2001-010999A, the skeleton of an adamantane derivative, and the like.

The aliphatic cyclic group is preferably a group derived from a compound represented by any one of Formulae (A) to (C), adamantane, or diamantane, is more preferably a group derived from a compound represented by Formula (A) or (B), or adamantane, and is even more preferably a group derived from a compound represented by Formula (A).

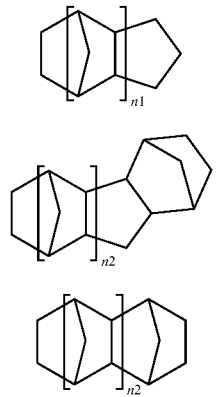

n1 in Formula (A) represents an integer of 1 to 3, preferably 1 or 2, and more preferably 1.

n2 in Formula (B) represents 1 or 2.

n3 in Formula (C) represents 1 or 2.

$R^4$ may be a linking group having a group derived from a compound represented by any one of Formulae (A) to (C), adamantane, or diamantane as an aliphatic cyclic group, and having other groups. Examples of other groups include an alkylene group having 1 to 6 carbon atoms which may be substituted, an amide group which may be substituted at the N-position, a carbamoyl group which may be substituted at the N-position, an ester group, an oxycarbonyl group, an ether group, and a group obtained by combining two or more thereof.

In Formula (II), k represents an integer of 1 to 7, preferably represents an integer of 1 to 5, more preferably represents an integer of 1 to 3, more preferably represents 1 or 2, and particularly preferably represents 1. In a case where k represents an integer of 2 or more, a plurality of $L_3$'s present may be the same as or different from each other, and a plurality of $P^1$'s may be the same as or different from each other.

$L_3$ in Formula (II) represents a single bond or a divalent linking group. In a case where $L_3$ represents a divalent linking group, although not particularly limited, a linking group including at least one selected from the group consisting of —O—, —(C=O)—, —NH—, a hydrocarbon group which may have a substituent, and a heterocyclic group which may have a substituent may be adopted, and examples thereof include an alkylene group having 1 to 6 carbon atoms which may be substituted, an amide group which may be substituted at the N-position, a carbamoyl group which may be substituted at the N-position, an ester group, an oxycarbonyl group, an ether group, and a group obtained by combining two or more thereof.

$P^1$ in Formula (II) represents a vinyl group, a vinyl ether group, an acryloyl group, a methacryloyl group, an acrylamide group, a methacrylamide group, or a styryl group, and preferably represents an acryloyl group or a methacryloyl group.

Hereinafter, preferable specific examples of the monomer having at least two polymerizable groups are shown, but the present invention is not limited thereto.

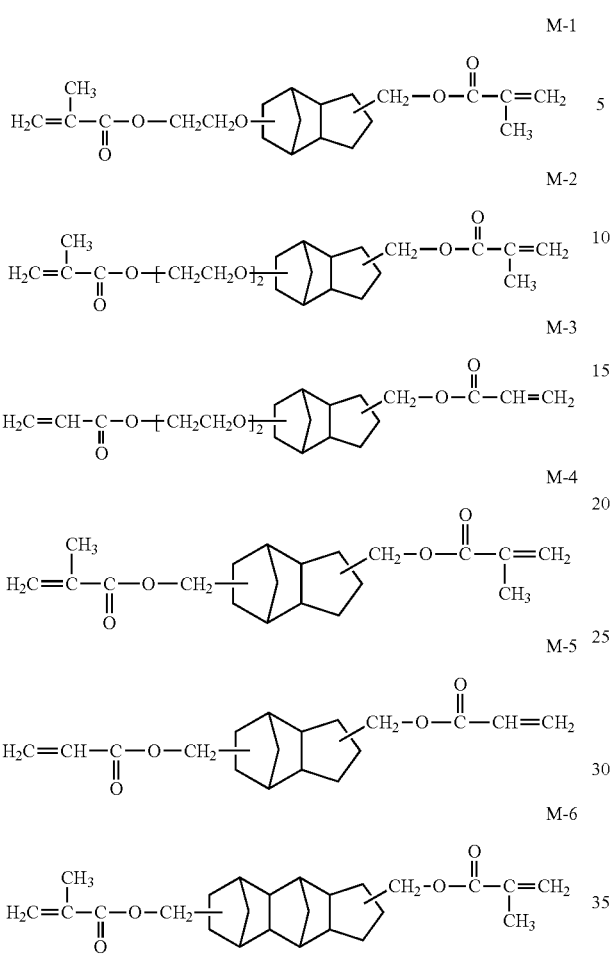

The copolymer (a) may have, in addition to the repeating unit derived from the fluorine-containing monomer represented by Formula (I) and the repeating unit derived from the monomer having at least two polymerizable groups, and repeating units other than these units (other repeating units).

The copolymer (a) preferably has a repeating unit derived from the monomer represented by Formula (III) as the other repeating unit. The repeating unit derived from the monomer represented by Formula (III) has a strong interaction with a hydroxyl group. That is, in a case where the composition including the copolymer (a) (film forming composition) is applied to a substrate film, and then an adhesive layer having a hydroxyl group is provided on the coating film surface, a part or all of the repeating unit derived from the monomer represented by the general formula (III) interacts with the hydroxyl group so that the copolymer (a) is diffused and adsorbed into the interface of the adhesive layer having a hydroxyl group and the inner side of the adhesive layer.

Accordingly, after the film and the adhesive layer are in contact with each other, the copolymer (a) having the repeating unit derived from a monomer represented by Formula (III) is present at the film, the adhesive layer, and the interface between both layers in the form of a copolymer having the chemical structure of the repeating unit derived from the monomer represented by Formula (III) as it is or a derivative (crosslinked reaction product) having a structure in which the repeating unit derived from the monomer represented by Formula (III) reacts with the hydroxyl group of the adhesive layer.

As described above, since the copolymer (a) having the repeating unit derived from the monomer represented by Formula (III) interacts with the adhesive layer, the adhesiveness between the film including the copolymer (a) and the adhesive layer can be further improved.

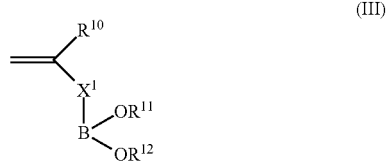

(III)

In Formula (III), $R^{10}$ represents a hydrogen atom or an alkyl group having 1 to 20 carbon atoms, $R^{11}$ and $R^{12}$ each independently represent a hydrogen atom, an aliphatic hydrocarbon group which may have a substituent, an aryl group which may have a substituent, or a heteroaryl group which may have a substituent, and $R^{11}$ and $R^{12}$ may be linked to each other. $X^1$ represents a divalent linking group.

The repeating unit derived from the monomer represented by Formula (III) is a repeating unit obtained by a reaction of an ethylenically unsaturated double bond in Formula (III) and is a repeating unit represented by Formula (PIII).

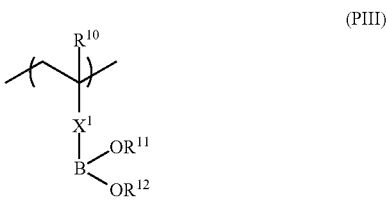

(PIII)

In Formula (PIII), $R^{10}$, $R^{11}$, $R^{12}$, and $X^1$ are the same as $R^{10}$, $R^{11}$, $R^{12}$, and $X^1$ in Formula (III), respectively.

In Formula (III), $R^{10}$ represents a hydrogen atom or an alkyl group having 1 to 20 carbon atoms, preferably a hydrogen atom or an alkyl group having 1 to 10 carbon atoms, more preferably a hydrogen atom or an alkyl group having 1 to 4 carbon atoms, and most preferably a hydrogen atom or a methyl group.

In Formula (III), in a case where $R^{11}$ and $R^{12}$ represent an aliphatic hydrocarbon group, the aliphatic hydrocarbon group is preferably an aliphatic hydrocarbon group having 1 to 12 carbon atoms and more preferably an aliphatic hydrocarbon group having 1 to 6 carbon atoms.

Examples of the aliphatic hydrocarbon group include an alkyl group, a cycloalkyl group, an alkenyl group, a cycloalkenyl group, and an alkynyl group.

Specific examples of the alkyl group include linear or branched groups such as a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, and a 2-methylhexyl group.

Specific examples of the cycloalkyl group include a cyclopentyl group, a cyclohexyl group, a 1-adamantyl group, and a 2-norbornyl group.

Specific examples of the alkenyl group include linear or branched alkenyl groups such as a vinyl group, 1-propenyl group, 1-butenyl group, a 1-methyl-1-propenyl group.

Specific examples of the cycloalkenyl group include a 1-cyclopentenyl group and a 1-cyclohexenyl group.

Specific examples of the alkynyl group include ethynyl group, 1-propynyl group, 1-butyryl group, 1-octynyl group and the like.

In a case where $R^{11}$ and $R^{12}$ represent an aryl group, the aryl group is preferably an aryl group having 6 to 12 carbon atoms, and more preferably an aryl group having 6 to 8 carbon atoms.

Specific examples of the aryl group include a phenyl group. Also, one in which two to four benzene rings form a fused ring, and one in which a benzene ring and an unsaturated five-membered ring form a fused ring may be included. Specific examples thereof include a naphthyl group, an anthryl group, a phenanthryl group, an indenyl group, an acenaphthenyl group, a fluorenyl group, and a pyrenyl group.

Examples of the heteroaryl group in a case where $R^{11}$ and $R^{12}$ represent a heteroaryl group include one in which one hydrogen atom of a heteroaromatic ring containing one or more hetero atoms selected from the group consisting of a nitrogen atom, an oxygen atom and a sulfur atom is eliminated to form a heteroaryl group. Specific examples of the heteroaromatic ring containing one or more hetero atoms selected from the group consisting of a nitrogen atom, an oxygen atom and a sulfur atom include pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranil, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, and pteridine.

$R^{11}$ and $R^{12}$ may be linked to each other. In this case, it is preferable that $R^{11}$ and $R^{12}$ each independently represent an alkyl group or an aryl group, and these groups are linked to each other, and it is more preferable that $R^{11}$ and $R^{12}$ each independently represent an alkyl group and these groups are linked to each other.

The divalent linking group represented by $X^1$ preferably includes at least one linking group selected from —(C=O)O—, —O(C=O)—, —(C=O)NH—, —O—, —CO—, —NH—, —O(C=O)—NH—, —O(C=O)—O—, or and the number of carbon atoms is preferably 7 or more.

Regarding $X^1$ in Formula (III), —(C=O)O— represents that C=O is bonded on the $R^{10}$ side and O is bonded on the B side. —O(C=O)— represents that O is bonded on the $R^{10}$ side and C=O is bonded on the B side. —(CO)NH— represents that C=O is bonded on the $R^{10}$ side and NH is bonded on the B side. —NH(C=O)— represents that NH is bonded on the $R^{10}$ side and C=O is bonded on the B side.

$R^{11}$, $R^{12}$ and $X^1$ may be substituted with one or more substituents, if possible. As the substituent, a monovalent nonmetallic atomic group excluding a hydrogen atom can be exemplified and for example, the substituent is selected from the following substituent group Z.

Substituent group Z:

Halogen atom (—F, —Br, —Cl, —I), hydroxyl group, alkoxy group, aryloxy group, mercapto group, alkyl thio group, aryl thio group, alkyl dithio group, aryl dithio group, amino group, N-alkyl amino group, N,N-dialkyl amino group, N-aryl amino group, N,N-diaryl amino group, N-alkyl-N-aryl amino group, acyloxy group, carbamoyloxy group, N-alkylcarbamoyloxy group, N-aryl carbamoyloxy group, N,N-dialkyl carbamoyloxy group, N,N-diaryl carbamoyloxy group, N-alkyl-N-aryl carbamoyloxy group, alkyl sulfoxy group, aryl sulfoxy group, acyl thio group, acyl amino group, N-alkyl acyl amino group, N-aryl acyl amino group, ureido group, N'-alkyl ureido group, N',N'-dialkyl ureido group, N'-aryl ureido group, N',N'-diaryl ureido group, N'-alkyl-N'-aryl ureido group, N-alkyl ureido group, N-aryl ureido group, N'-alkyl-N-alkyl ureido group, N'-alkyl-N-aryl ureido group, N',N'-dialkyl-N-alkyl ureido group, N',N'-dialkyl-N-aryl ureido group, N'-aryl-N-alkyl ureido group, N'-aryl-N-aryl ureido group, N',N'-diaryl-N-alkyl ureido group, N',N'-diaryl-N-aryl ureido group, N'-alkyl-N'-aryl-N-alkyl ureido group, N'-alkyl-N'-aryl-N-aryl ureido group, alkoxy carbonyl amino group, aryloxy carbonyl amino group, N-alkyl-N-alkoxycarbonyl amino group, N-alkyl-N-aryloxy carbonyl amino group, N-aryl-N-alkoxycarbonyl amino group, N-aryl-N-aryloxycarbonyl amino group, formyl group, acyl group, carboxyl group and its conjugated basic group, alkoxy carbonyl group, aryloxy carbonyl group, carbamoyl group, N-alkyl carbamoyl group, N,N-dialkyl carbamoyl group, N-aryl carbamoyl group, N,N-diaryl carbamoyl group, N-alkyl-N-aryl carbamoyl group, alkyl sulfinyl group, aryl sulfinyl group, alkyl sulfonyl group, aryl sulfonyl group, sulfo group (—SO$_3$H) and its conjugated basic group, alkoxy sulfonyl group, aryloxy sulfonyl group, sulfinamoyl group, N-alkyl sulfinamoyl group, N,N-dialkyl sulfinamoyl group, N-aryl sulfinamoyl group, N,N-diaryl sulfinamoyl group, N-alkyl-N-aryl sulfinamoyl group, sulfamoyl group, N-alkyl sulfamoyl group, N,N-dialkyl sulfamoyl group, N-aryl sulfamoyl group, N,N-diaryl sulfamoyl group, N-alkyl-N-aryl sulfamoyl group, N-acyl sulfamoyl group and its conjugated basic group, N-alkyl sulfonyl sulfamoyl group (—SO$_2$NHSO$_2$(alkyl)) and its conjugated basic group, N-aryl sulfonyl sulfamoyl group (—SO$_2$NHSO$_2$(aryl)) and its conjugated basic group, N-alkyl sulfonyl carbamoyl group (—CONHSO$_2$(alkyl)) and its conjugated basic group, N-aryl sulfonyl carbamoyl group (—CONHSO$_2$(aryl)) and its conjugated basic group, alkoxy silyl group (—Si(Oalkyl)$_3$), aryloxy silyl group (—Si(Oaryl)$_3$), hydroxysilyl group (—Si(OH)$_3$) and its conjugated basic group, phosphono group (—PO$_3$H$_2$) and its conjugated basic group, dialkyl phosphono group (—PO$_3$(alkyl)$_2$), diaryl phosphono group (—PO$_3$(aryl)$_2$), alkyl aryl phosphono group (—PO$_3$(alkyl)(aryl)), monoalkyl phosphono group (—PO$_3$H(alkyl)) and its conjugated basic group, monoaryl phosphono group (—PO$_3$H(aryl)) and its conjugated basic group, phosphonoxy group (—OPO$_3$H$_2$) and its conjugated basic group, dialkyl phosphonoxy group (—OPO$_3$(alkyl)$_2$), diaryl phosphonoxy group (—OPO$_3$(aryl)$_2$), alkyl aryl phosphonoxy group (—OPO$_3$(alkyl)(aryl)), monoalkyl phosphonoxy group (—OPO$_3$H(alkyl)) and its conjugated basic group, monoaryl phosphonoxy group (—OPO$_3$H(aryl)) and its conjugated basic group, cyano group, nitro group, aryl group, alkenyl group, and alkynyl group.

In addition, if possible, these substituents may be bonded to one another or to a substituted hydrocarbon group to form a ring.

$R^{11}$ and $R^{12}$ in Formula (III) each independently represent a hydrogen atom or an alkyl group, or both preferably represent an alkyl group and bonded to each other to form a ring. Both $R^{11}$ and $R^{12}$ preferably represent a hydrogen atom or an alkyl group, and are preferably bonded to each other to form a ring.

From the viewpoint of adhesiveness, it is preferable that the repeating unit derived from the monomer represented by Formula (III) is a repeating unit derived from a monomer represented by Formula (V). Improvement of adhesiveness by the repeating unit derived from the monomer represented by Formula (V) is presumed to be due to the effect of bringing polarity closer to the adhesive layer having a hydroxyl group.

The preferable range of each of $R^{10}$, $R^{11}$, and $R^{12}$ in Formula (V) is the same as the preferable range of each of $R^{10}$, $R^{11}$, and $R^{12}$ in Formula (III).

The repeating unit derived from the monomer represented by Formula (III) or (V) is more preferably a repeating unit derived from the monomer represented by Formula (VI).

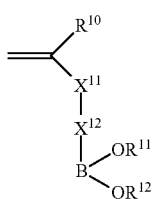

(V)

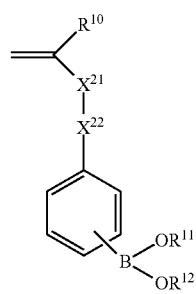

(VI)

In Formula (V), $R^{10}$ represents a hydrogen atom or an alkyl group having 1 to 20 carbon atoms, and $R^{11}$ and $R^{12}$ each independently represents a hydrogen atom, an aliphatic hydrocarbon group which may have a substituent, an aryl group which may have a substituent, or a heteroaryl group which may have a substituent, and $R^{11}$ and $R^{12}$ may be linked to each other. $X^{11}$ represents a divalent linking group including at least one selected from the group consisting of —(C=O)O—, —O(C=O)—, —(C=O)NH—, —O—, —CO—, and —CH$_2$—. $X^{12}$ represents a divalent linking group including at least one linking group selected from —(C=O)O—, —O(C=O)—, —(C=O)NH—, —O—, —CO—, —NH—, —O(C=O)—NH—, —O(C=O)—O—, or —CH$_2$—, and including at least one aromatic ring which may have a substituent. However, the total carbon atom number of $X^{11}$ and $X^{12}$ is 7 or more.

As $X^{11}$ in Formula (V), —(C=O)O—, —O(C=O)—, or —(C=O)NH— is preferable and —(C=O)O— is most preferable.

$X^{12}$ preferably contains 1 to 5 aromatic rings, more preferably contains to 4 aromatic rings, and most preferably contains 2 to 3 aromatic rings.

In Formula (VI), $R^{10}$ represents a hydrogen atom or an alkyl group having 1 to 20 carbon atoms, $R^{11}$ and $R^{12}$ each independently represent a hydrogen atom, an aliphatic hydrocarbon group which may have a substituent, an aryl group which may have a substituent, or a heteroaryl group which may have a substituent, and $R^{11}$ and $R^{12}$ may be linked to each other, $X^{21}$ represents —(C=O)O—, or —(C=O)NH—. $X^{22}$ represents a divalent linking group including at least one linking group selected from the group consisting of —(C=O)O—, —O(C=O)—, —(C=O)NH—, —O—, —CO—, —O(CO)—NH—, —O(C=O)—O—, and —CH$_2$—, and $X^{22}$ may include an aromatic ring which may have a substituent.

The preferable range of each of $R^{10}$, $R^{11}$, and $R^{12}$ in Formula (VI) is the same as the preferable range of each of $R^{10}$, $R^{11}$, and $R^{12}$ in Formula (III).

Specific examples of the monomer represented by Formula (III), (V) or (VI) are shown, but the present invention is not limited thereto.

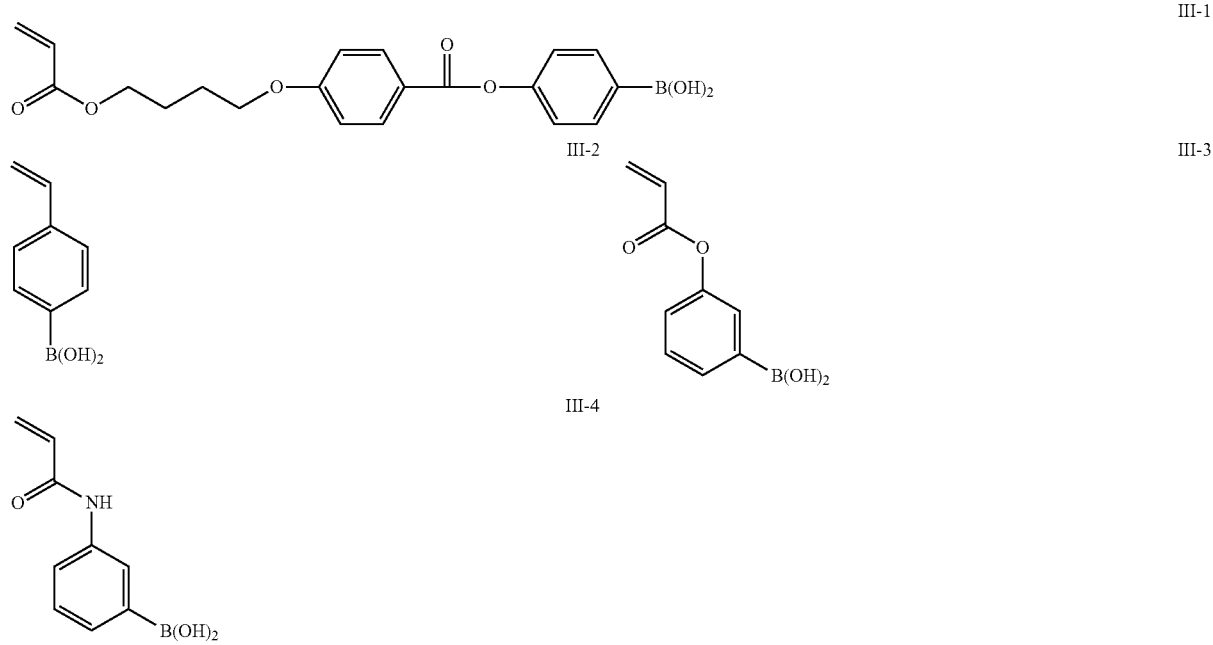

-continued
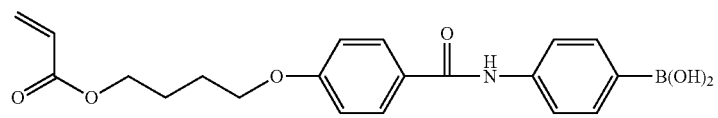
III-5
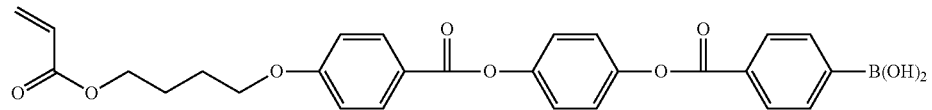
III-6
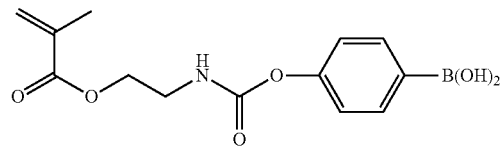
III-7
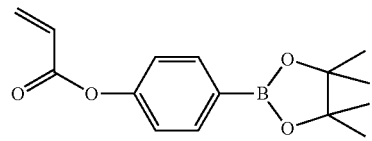
III-8
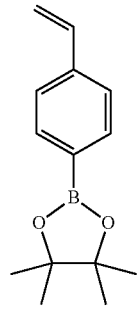
III-9
III-10
III-11
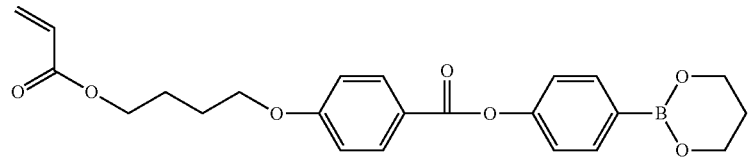
III-12
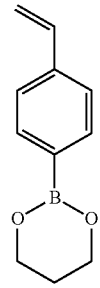
III-13
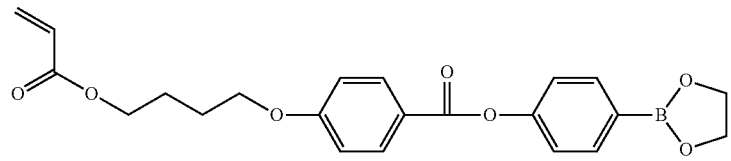
III-14

III-15

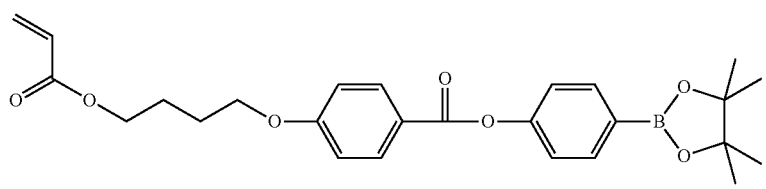

As other kinds of monomers which give other repeating units, monomers described in Polymer Handbook 2nd ed., J. Brandrup, Wiley Interscience (1975) Chapter 2, Pages 1 to 483 can be used. For example, compounds having one addition polymerizable unsaturated bond selected from acrylic acid, methacrylic acid, acrylic acid esters, methacrylic acid esters, acrylamides, methacrylamides, allyl compounds, vinyl ethers, vinyl esters, dialkyl itaconates, dialkyl esters or monoalkyl esters of fumaric acid, and the like can be used.

Specific examples of monomers that give other repeating units include the following monomers.

Acrylic Acid Esters:
methyl acrylate, ethyl acrylate, propyl acrylate, chloroethyl acrylate, 2-hydroxyethyl acrylate, trimethylolpropane monoacrylate, benzyl acrylate, methoxybenzyl acrylate, phenoxyethyl acrylate, furfuryl acrylate, tetrahydrofurfuryl acrylate, 2-acryloyloxyethyl succinate, 2-carboxyethyl acrylate, and the like;

Methacrylic Acid Esters:
methyl methacrylate, ethyl methacrylate, propyl methacrylate, chloroethyl methacrylate, 2-hydroxyethyl methacrylate, trimethylolpropane monomethacrylate, benzyl methacrylate, methoxybenzyl methacrylate, phenoxyethyl methacrylate, furfuryl methacrylate, tetrahydrofurfuryl methacrylate, ethylene glycol monoacetoacetate monomethacrylate, 2-methacryloyloxyethyl phthalate, 2-methacryloyloxyethyl succinate, 2-methacryloyloxyethyl hexahydrophthalate, 2-carboxyethyl methacrylate, and the like;

Acrylamides:
acrylamide, N-alkyl acrylamide (as the alkyl group, an alkyl group having 1 to 3 carbon atoms, for example, a methyl group, an ethyl group, or a propyl group), N,N-dialkyl acrylamide (as the alkyl group, an alkyl group having 1 to 6 carbon atoms) N-hydroxyethyl-N-methylacrylamide, N-2-acetamidoethyl-N-acetylacrylamide, and the like;

Methacrylamides:
methacrylamide, N-alkyl methacrylamide (as the alkyl group, an alkyl group having 1 to 3 carbon atoms, for example, a methyl group, an ethyl group, or a propyl group), N,N-dialkyl methacrylamide (as the alkyl group, an alkyl group having 1 to 6 carbon atoms), N-hydroxyethyl-N-methylmethacrylamide, N-2-acetamidoethyl-N-acetyl methacrylamide, and the like;

Allyl Compounds:
allyl esters (for example, allyl acetate, allyl caproate, allyl caprylate, allyl laurate, allyl palmitate, allyl stearate, allyl benzoate, allyl acetoacetate, and allyl lactate), allyloxyethanol, and the like;

Vinyl Ethers:
alkyl vinyl ether (for example, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, tetrahydro furfuryl vinyl ether, and the like;

Vinyl Esters:
vinyl acetate, vinyl butyrate, vinyl isobutyrate, vinyl trimethylacetate, vinyl diethylacetate, vinyl valerate, vinyl caproate, vinyl chloroacetate, vinyl dichloroacetate, vinyl methoxyacetate, vinyl butoxyacetate, vinyl lactate, vinyl-β-phenylbutyrate, vinyl cyclohexylcarboxylate, and the like;

Dialkyl Itaconates:
dimethyl itaconate, diethyl itaconate, dibutyl itaconate, and the like;

Dialkyl esters or monoalkyl esters of fumaric acid: dibutyl fumalate and the like.

Examples of monomers which give other repeating units include crotonic acid, itaconic acid, acrylonitrile, methacrylonitrile, maleonitrile, styrene, 4-vinyl benzoic acid, styrene macromer (AS-6S manufactured by Toagosei Co., Ltd.), and methyl methacrylate macromer (AA-6 manufactured by Toagosei Co., Ltd.). In addition, it is also possible to convert the structure of the polymer after polymerization by a polymer reaction.

The content of the repeating unit derived from the fluorine-containing monomer represented by Formula (I) in the copolymer (a) is preferably 1% to 65% by mass, more preferably 3% to 40% by mass, and even more preferably 5% to 15% by mass with respect to the total mass of the copolymer (a).

In the present invention, the total mass of the copolymer (a) is the total mass of all repeating units included in the copolymer (a).

The content of the repeating unit derived from the monomer having at least two polymerizable groups in the copolymer (a) is preferably 30% by mass or more with respect to the total mass of the copolymer (a). In a case where the content is 30% by mass or more, the crosslinked structures included in the copolymer (a) are increased and release from the film surface is suppressed. Thus, high adhesiveness between the film according to the embodiment of the present invention and other layers can be expressed.

The content of the repeating unit derived from the monomer having at least two polymerizable groups in the copolymer (a) is more preferably 30% to 99% by mass, even more preferably 40% to 98% by mass, and particularly preferably 50% to 95% by mass.

In a case where the copolymer (a) has other repeating units, the content of other repeating units is preferably 0.5% to 20% by mass, more preferably 1% to 15% by mass, and even more preferably 3% to 10% by mass with respect to the total mass of the copolymer (a).

As described above, since it is preferable that the copolymer (a) has the repeating unit derived from the monomer represented by Formula (III) as the other repeating unit, the content of the repeating unit derived from the monomer represented by Formula (III) in the copolymer (a) is preferably 0.5% to 20% by mass, more preferably 1% to 15% by mass, and even more preferably 3% to 10% by mass with respect to the total mass of the copolymer (a).

The weight-average molecular weight (Mw) of the copolymer (a) is preferably 20,000 or more, more preferably 20,000 to 1,000,000, even more preferably 50,000 to 800,000, and particularly preferably 100,000 to 500,000.

By setting the molecular weight within this range, solubility is excellent in a case of adding the copolymer (a) to the composition and in a case of preparing a film together with other resins (in a case where other resins are included in the composition), entanglement with other resins is large. Thus, the release of the copolymer (a) from the film surface can be reduced, and good adhesiveness can be obtained.

The weight-average molecular weight is a value measured by gel permeation chromatography (GPC) under the following conditions.

[Eluent] Tetrahydrofuran (THF)
[Apparatus name] EcoSEC HLC-8320GPC (manufactured by Tosoh Corporation)
[Column] TSKgel Super AWM-H (manufactured by Tosoh Corporation)
[Column temperature] 40° C.
[Flow rate] 0.50 ml/min Although a crosslinked structure can be introduced into the copolymer (a) by arbitrary means, the copolymer (a) is preferably synthesized by a method in which a the fluorine-containing monomer represented by Formula (I) and the monomer having at least two polymerizable groups are copolymerized to directly produce a crosslinked copolymer.

The copolymer (a) can be polymerized by a known method. Examples include a solution polymerization method, a suspension polymerization method, an emulsion polymerization method, and a melt polymerization method. Among these, the copolymer (a) is preferably synthesized by a solution polymerization method.

In order to prevent insolubilization due to gelation during synthesis, the molecular weight of the copolymer (a) can be appropriately adjusted. Examples of the method for adjusting the molecular weight include changing the initiator amount, changing the monomer concentration, and using a chain transfer agent, but it is preferable to change the monomer concentration for adjustment.

The composition according to the embodiment of the present invention contains the copolymer (a). Hereinafter, the composition according to the embodiment of the present invention is also referred to as "composition (a)".

From the viewpoint of adhesiveness with other layers and the like, the copolymer (a) is contained in an amount of 15% by mass or more with respect to the total solid content in the composition (a). The content of the copolymer (a) is preferably 20% to 100% by mass and more preferably 40% to 80% by mass with respect to the total solid content in the composition (a).

The composition (a) may contain other components in addition to the copolymer (a). Other components include other resins different from the copolymer (a). As the other resin, a polymer resin shown below is preferable.

<Polymer Resin>

The polymer resin (hereinafter, also referred to as "resin (d)") preferably includes, for example, a polar structure capable of strengthening the interaction between polymer molecules from the viewpoint of brittleness and improvement in modulus of elasticity. Specific examples thereof include aromatic vinyl-based resin (preferably styrene-based resin), cellulose-based resin (cellulose acylate resin, cellulose ether resin, or the like), cyclic olefin-based resin, polyester-based resin, polycarbonate-based resin, vinyl-based resin other than aromatic vinyl-based resin, polyimide-based resin, and polyarylate-based resin, and aromatic vinyl-based resin and cyclic olefin resin are preferable from the viewpoint of hygroscopicity and moisture permeability.

The aromatic vinyl-based resin is a vinyl-based resin including at least one aromatic ring, and examples thereof include styrene-based resin, divinylbenzene-based resin, 1,1-diphenyl styrene-based resin, vinylnaphthalene-based resin, vinylanthracene-based resin, N,N-diethyl-p-aminoethylstyrene-based resin, and vinylpyridine-based resin, and as the copolymerization component, a vinylpyridine unit, a vinylpyrrolidone unit, a maleic acid anhydride unit, and the like may be appropriately included. Among the aromatic vinyl-based resins, from the viewpoint of controlling the photoelastic coefficient and hygroscopicity, it is preferable that the film according to the embodiment of the present invention includes a styrene-based resin.

The resin (d) may be used alone or in combination of two or more thereof.

<<Styrene-Based Resin>>

As an example of the styrene-based resin, a resin including 50% by mass or more of a repeating unit derived from a styrene-based monomer is exemplified. Here, the styrene-based monomer means a monomer having a styrene skeleton in its structure.

Specific examples of the styrene-based monomer include styrene or a derivative thereof. Here, the styrene derivative is a compound prepared by bonding styrene with another group, and examples thereof include alkylstyrene such as o-methylstyrene, m-methylstyrene, p-methylstyrene, 2,4-dimethylstyrene, o-ethylstyrene, or p-ethylstyrene, and substituted styrene having a hydroxyl group, an alkoxy group, a carboxyl group, or a halogen introduced into the benzene nucleus of styrene, such as hydroxystyrene, tert-butoxystyrene, vinyl benzoic acid, o-chlorostyrene and p-chlorostyrene.

The styrene-based resin may be a homopolymer of styrene or a derivative thereof, and additionally, a copolymer obtained by copolymerizing a styrene-based monomer component with another monomer component is also included. Examples of the copolymerizable monomer include unsaturated carboxylic acid alkyl ester monomers including alkyl methacrylates such as methyl methacrylate, cyclohexyl methacrylate, methylphenyl methacrylate, and isopropyl methacrylate; and alkyl acrylates such as methyl acrylate, ethyl acrylate, butyl acrylate, 2-ethylhexyl acrylate, and cyclohexyl acrylate, unsaturated carboxylic acid monomers such as methacrylic acid, acrylic acid, itaconic acid, maleic acid, fumaric acid, and cinnamic acid, unsaturated dicarboxylic acid anhydride monomers as anhydrides of maleic acid, itaconic acid, ethylmaleic acid, methyl itaconic acid, chloromaleic acid, and the like, unsaturated nitrile monomers such as acrylonitrile, and methacrylonitrile, and conjugated dienes such as 1,3-butadiene, 2-methyl-1,3-butadiene (isoprene), 2,3-dimethyl-1,3-butadiene, 1,3-pentadiene, and 1,3-hexadiene, and two or more of these can be copolymerized.

The polystyrene-based resin is not particularly limited and examples thereof include a homopolymer of a styrene-based monomer such as general purpose polystyrene (GPPS) which is a homopolymer of styrene; a copolymer constituted only of two or more kinds of styrene-based monomers as a monomer component; a styrene-diene-based copolymer; a copolymer such as a styrene-polymerizable unsaturated carboxylic acid ester-based copolymer; a mixture of polystyrene and synthetic rubber (for example, polybutadiene, polyisoprene, or the like); high impact polystyrene (HIPS) such as polystyrene obtained by graft-polymerizing styrene to synthetic rubber; a polystyrene obtained by dispersing a rubbery elastomer in a continuous phase of a polymer including a styrene-based monomer (for example, a copolymer of a styrene-based monomer and a (meth)acrylate ester-based monomer) and graft-polymerizing the copolymer with the rubbery elastomer (also referred to as graft type high impact polystyrene, "graft HIPS"); and a styrene-based elastomer.

In addition, the polystyrene-based resin is not particularly limited and may be hydrogenated. That is, the polystyrene-based resin may be a polystyrene-based resin to which hydrogen is added (hydrogenated polystyrene-based resin). Although the hydrogenated polystyrene-based resin is not particularly limited, the hydrogenated polystyrene-based resin is preferably a hydrogenated styrene-diene-based copolymer such as a hydrogenated styrene-butadiene-styrene block copolymer (SEBS) or hydrogenated styrene-isoprene-styrene block copolymer (SEPS) which is a resin obtained by adding hydrogen to SBS or SIS. Only one of these hydrogenated polystyrene-based resins may be used, or two or more thereof may be used.

The styrene-based resins may be used alone or a plurality of kinds of styrene-based resins having different repeating unit compositions, molecular weights, and the like may be used in combination.

The styrene-based resin can be obtained by a known anion, bulk, suspension, emulsion or a solution polymerization method. In addition, in the styrene-based resin, the unsaturated double bond of the benzene ring of the conjugated diene or the styrene-based monomer may be hydrogenated. The hydrogenation rate can be measured by a nuclear magnetic resonance apparatus (NMR).

<<Cyclic Olefin-Based Resin>>

In a case where a cyclic olefin-based resin is used as a material constituting the film according to the embodiment of the present invention, for example, a thermoplastic resin having a unit of a monomer constituted of a cyclic olefin such as norbornene or polycyclic norbornene-based monomer may be used and is also referred to as a thermoplastic cyclic olefin-based resin. The thermoplastic cyclic olefin-based resin may be a ring-opened polymer of the cyclic olefin or a hydrogenated product of a ring-opened copolymer using two or more cyclic olefins and may be an addition polymer of a cyclic olefin and a chain olefin and an aromatic compound having a polymerizable double bond such as a vinyl group. The cyclic olefin-based resin may have a polar group introduced therein.

In a case where a copolymer of a cyclic olefin and a chain olefin and/or an aromatic compound having a vinyl group is used as the material for the film according to the embodiment of the present invention, as the chain olefin, ethylene, propylene, and the like may be used, and as the aromatic compound having a vinyl group, styrene, α-methylstyrene, nuclear alkyl-substituted styrene, and the like may be used. In such a copolymer, the unit of the monomer constituted of the cyclic olefin is preferably 50% by mol or less, and more preferably about 15% to 50% by mol. Particularly, in a case where a ternary copolymer of a cyclic olefin, a chain olefin, and an aromatic compound having a vinyl group is used as the material for the film according to the embodiment of the present invention, the unit of the monomer constituted of the cyclic olefin can be reduced to a relatively small amount as described above. In the ternary copolymer, the unit of the monomer constituted of the chain olefin is typically 5% to 80% by mol, and the unit of the monomer constituted of the aromatic compound having a vinyl group is typically 5% to 80% by mol.

As the cyclic olefin-based resin, any suitable commercially available product can be used, and examples thereof include "TOPAS" manufactured by TOPAS ADVANCED POLYMERS GmbH in Germany and available from Polyplastics Co. Ltd. in Japan, "ARTON" available from JSR Corporation, "ZEONOR" and "ZEONEX" available from Zeon Corporation, and "APEL" available from Mitsui Chemicals Inc. (all trade names).

(Weight-Average Molecular Weight of Resin (d))

The weight-average molecular weight (Mw) of the resin (d) is not particularly limited and is preferably 5,000 to 800,000, more preferably 100,000 to 600,000, and even more preferably 120,000 to 400,000.

The weight-average molecular weight of the resin (d) is obtained by measuring the weight-average molecular weight (Mw) and the molecular weight distribution (Mw/Mn) in terms of standard polystyrene under the following conditions. Mn is the number average molecular weight in terms of standard polystyrene.

GPC: gel permeation chromatograph apparatus (HLC-8220GPC, manufactured by Tosoh Corporation, column; guard columns HXL-H, TSK gel G7000HXL, two columns of TSK gel GMHXL, TSK gel G2000HXL, manufactured by Tosoh Corporation, sequentially linked together, eluent; tetrahydrofuran, flow rate; 1 mL/min, sample concentration; 0.7% to 0.8% by mass, sample injection amount; 70 µL, measurement temperature; 40° C., detector; differential refractometer (RI) meter (40° C.), standard substance; TSK standard polystyrene manufactured by Tosoh Corporation)

In a case where the composition (a) contains the resin (d), the composition may include one kind of resin (d) or two or more kinds of resins (d). In a case where the film according to the embodiment of the present invention formed to have a multilayer structure, the resin (d) included in each layer may be different from each other.

(Content of Resin (d) in Composition (d))

In the resin (d), the content of the resin (d) is preferably 0% to 80% by mass and more preferably 20% to 60% by mass in a case where the total solid content (all components excluding a solvent) of the composition (a) is 100% by mass.

In addition, regarding the content mass ratio between the resin (d) and the copolymer (a) in the composition (a), the content mass of the resin (d):the content mass of the copolymer is preferably 0:100 to 85:15, more preferably 10:90 to 80:20, and even more preferably 40:60 to 70:30.

(Solvent)

It is preferable that the composition contains a solvent. Since the composition (a) contains a solvent, the composition is preferably used as a coating solution. The solvent may be appropriately selected from the viewpoint of being capable of dissolving or dispersing the material for forming the film according to the embodiment of the present invention, easily forming a uniform surface in a coating step and a drying step, securing liquid preservability, having a suitable saturated vapor pressure, and the like. Examples of such an organic solvent include dibutyl ether, dimethoxyethane, diethoxyethane, propylene oxide, 1,4-dioxane, 1,3-dioxolane, 1,3,5-trioxane, tetrahydrofuran, anisole, phenetole, dimethyl carbonate, methyl ethyl carbonate, diethyl carbonate, acetone, methyl ethyl ketone (MEK), diethyl ketone, dipropyl ketone, diisobutyl ketone, cyclopentanone, cyclohexanone, methylcyclohexanone, ethyl formate, propyl formate, pentyl formate, methyl acetate, ethyl acetate, propyl acetate, methyl propionate, ethyl propionate, γ-butyrolactone, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate, ethyl acetoacetate, methyl alcohol, ethyl alcohol, isopropyl alcohol, n-butyl alcohol, cyclohexyl alcohol, isobutyl acetate, methyl isobutyl ketone (MBK), 2-octanone, 2-heptanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, toluene, and xylene. One of these solvents may be used alone, or two or more thereof may be used in combination.

Among the solvents, it is preferable to use at least one of dimethyl carbonate, methyl acetate, ethyl acetate, methyl ethyl ketone, acetyl acetone, or acetone, it is more preferable to use any of dimethyl carbonate and methyl acetate, and it is particularly preferable to use methyl acetate.

The solvent is used such that the concentration of the total solid content of the composition (a) is preferably in a range of 5% to 80% by mass, more preferably in a range of 10% to 75% by mass, and even more preferably in a range of 15% to 70% by mass.

(Other Additives)

In the composition (a), as other additives, known additives can be appropriately mixed. For example, in a case where the film formed of the composition (a) is used as an optical film such as a polarizing plate protective film, as known additives, a low molecular weight plasticizer, a leveling agent, an oligomer-based additive, a polyester-based additive, a retardation control agent, a matting agent, an ultraviolet absorber, a deterioration inhibitor, a peeling promoter, an infrared absorber, an antioxidant, a filler, a compatibilizer, and the like may be used.

(Matting Agent)

A matting agent (fine particles) may be added to the composition (a) for imparting to lubricity and preventing blocking. As fine particles, silica (silicon dioxide, $SiO_2$) of which the surface is coated with a hydrophobic group and which has a morphology of secondary particles is preferably used. Along with silica or in place of silica, other fine particles of titanium dioxide, aluminium oxide, zirconium oxide, calcium carbonate, talc, clay, calcined kaolin, calcined calcium silicate, hydrated calcium silicate, aluminium silicate, magnesium silicate, calcium phosphate, and the like may also be used as fine particles. Examples of commercial products of such fine particles include trade names of R972 and NX90S (both manufactured by Nippon Aerosil Co., Ltd.).

[Method for Producing Composition (a)]

A method for producing the composition (a) has a step of polymerizing the fluorine-containing monomer represented by Formula (I) and a monomer having at least two polymerizable groups to obtain a fluorine-containing copolymer, and a step of producing a composition including the fluorine-containing copolymer. Other additives that may be contained in the fluorine-containing copolymer and the composition (a) are as described above.

[Film]

The film according to the embodiment of the present invention is a film formed of the composition (a) (film forming composition). The film according to the embodiment of the present invention is preferably a film formed by applying the film forming composition to the substrate film. In a case where the copolymer (a) has the repeating unit derived from the monomer represented by Formula (III) and an adhesive layer having a hydroxyl group is provided on the surface of the film, the copolymer (a) may form an interaction with the hydroxyl group in the film.

The film according to the embodiment of the present invention may be any of transparent film, an opaque film, and a colored film, but is preferably a transparent film. In addition, the transparent film may have a transmittance of 80% or more and a haze value of 5% or less. In addition, the film according to the embodiment of the present invention may be a film having a phase difference.

The film according to the embodiment of the present invention includes at least the copolymer (a), but may include the components included in the above-described composition (a) in addition to the copolymer (a). However, the solvent may be usually not substantially contained in the film since the coating film is dried after the composition (a) is applied.

Specific examples of the film according to the embodiment of the present invention include a polarizer protective film (a polarizing plate protective film), a low moisture permeable film, an optically anisotropic film, and an optically isotropic film.

Since the film according to the embodiment of the present invention is particularly excellent in adhesiveness with a resin having a hydroxyl group in a case where the copolymer (a) has the repeating unit derived from the monomer represented by Formula (III), other layers and the like directly in contact with the film according to the embodiment of the present invention preferably includes a resin having a hydroxyl group. Examples of the resin having a hydroxyl group include polyvinyl alcohol-based resins, polyvinyl butyral resins, and bisphenol A type epoxy resins.

(Configuration of Film)

The film according to the embodiment of the present invention may be a single film or may have a laminated structure of two or more layers.

(Film Thickness)

The film thickness of the film according to the embodiment of the present invention is preferably 0.1 to 30 µm, more preferably 0.2 to 20 µm, and even more preferably 0.4 to 10 µm. By setting the film thickness to 0.1 µm or more, it becomes possible to secure processing suitability and durability in a case of lamination on a polarizer, and a film thickness of 30 µm or less is preferable from the viewpoint of being capable of reducing the thickness of a polarizing plate. In addition, in a case where the film is mounted on a liquid crystal display device, the effect of reducing light unevenness of the liquid crystal display device due to environmental change and the effect of reducing warping of the liquid crystal panel due to temperature and humidity change can be expected, and thus the film thickness is preferable.

[Method for Producing Film]

A method for producing the film according to the embodiment of the present invention is not particularly limited and the film can be formed by a method for forming a coating film on the substrate film by a known coating method, or a solution film forming method. However, a coating method is particularly preferably used. That is, it is preferable that the method for producing the film according to the embodiment of the present invention has a step of applying the composition (a).

As the coating method, known methods such as dip coating method, an air knife coating method, a curtain coating method, a roller coating method, a wire bar coating method, a gravure coating method, a slide coating method, an extrusion coating method (die coating method) (refer to JP2003-164788A), and a microgravure coating method may be used and among these, a microgravure coating method and a die coating method are preferable. However, there is no limitation thereto. In a case where the film is formed by a coating method, a drying step of volatilizing a solvent can be appropriately used.

In the present invention, the heat treatment in the drying step is not particularly limited as long as the film is not impaired, and is preferably performed at 40° C. to 150° C. and more preferably 40° C. to 110° C.

The time required for the heat treatment varies depending on the molecular weight of the components used, interaction with other components, viscosity, and the like, and is 15 seconds to 1 hour, preferably 20 seconds to 30 minutes, and most preferably 30 seconds to 5 minutes.

In the solution film forming method, after a concentration step or a filtration step is appropriately performed, the composition (a) according to the embodiment of the present invention is uniformly cast on a support. Next, the half dried film is peeled off from the support, and both ends of the web are appropriately held with clips or the like, and the solvent is dried in a drying zone. Further, stretching may be performed separately during the drying of the film or after the drying is completed.

<Substrate Film>

The film thickness of the substrate film used for forming the film by a coating method is preferably 5 to 100 µm, more preferably 10 to 75 µm, and even more preferably 15 to 55 µm. In a case where the film thickness is 5 µm or more, sufficient mechanical strength is easily secured and defects such as curling, wrinkling, buckling and the like are not easily caused. Thus, this case is preferable. A case where the film thickness is 100 µm or less is preferable since, for example, in a case where the multilayer film of the film according to the embodiment of the present invention and the substrate film is stored in a long roll form, it is easy to adjust the surface pressure applied to the multilayer film to be in an appropriate range and adhesion failure is not easily generated.

The surface energy of the substrate film is not particularly limited, and the adhesive force between the film according to the embodiment of the present invention and the substrate film can be adjusted by adjusting the relationship between the surface energy of the material of the film according to the embodiment of the present invention and the coating solution and the surface energy of the surface of the substrate film on which the film according to the embodiment of the present invention is to be formed. In a case where the surface energy difference is reduced, the adhesive force tends to increase, and in a case where the surface energy difference is increased, the adhesive force tends to decrease, and thus the surface energy can be set appropriately.

The surface energy of the substrate film can be calculated from the contact angle value between water and methylene iodide using the Owens method. For measurement of the contact angle, for example, DM901 (contact angle meter, manufactured by Kyowa Interface Science Co., Ltd.) can be used.

The surface energy of the substrate film on which the film according to the embodiment of the present invention is to be formed is preferably 41.0 to 48.0 mN/m and more preferably 42.0 to 48.0 mN/m. In a case where the surface energy is 41.0 mN/m or more, the uniformity of the thickness of the film according to the embodiment of the present invention is increased and thus this case is preferable. In a case where the surface energy is 48.0 mN/m or less, the peeling force between the film according to the embodiment of the present invention and the substrate film is easily controlled to be in an appropriate range and thus this case is preferable.

The surface unevenness of the substrate film is not particularly limited and depending on the relationship between the surface energy, the hardness, and the surface unevenness of the surface of the film according to the embodiment of the present invention, and the surface energy and hardness of the surface of the substrate film opposite to the side on which the film according to the embodiment of the present invention is formed, for example, in order to prevent adhesion failure in a case where the film according to the embodiment of the present invention and the substrate film are stored in a long roll form, the surface unevenness of the substrate film can be adjusted. In a case where the surface unevenness is increased, adhesion failure tends to be suppressed, and in a case where the surface unevenness is reduced, the surface unevenness of the film according to the embodiment of the present invention tends to decrease and the haze of the film according to the embodiment of the present invention tends to be small. Thus, the surface unevenness can be set appropriately.

For such a substrate film, known materials and films can be appropriately used. Specific examples of materials include a polyester-based polymer, an olefin-based polymer, a cyclo olefin-based polymer, a (meth)acrylic polymer, a cellulose-based polymer, and a polyamide-based polymer.

Particularly, as the material of the substrate film, the polyester-based polymer and the olefin-based polymer are preferable, the polyester-based polymer is more preferable, and polyethylene terephthalate (PET) is particularly preferable among the polyester polymers.

For the purpose of adjusting the surface properties of the substrate film, a surface treatment can be appropriately performed. For example, a corona treatment, a room temperature plasma treatment, a saponification treatment and the like can be performed to lower the surface energy, and a silicone treatment, a fluorine treatment, an olefin treatment and the like can be performed to raise the surface energy.

A releasing agent or the like may be appropriately applied to the substrate surface in advance to control adhesiveness with the film according to the embodiment of the present invention. The film according to the embodiment of the present invention can be used by peeling off the substrate film after laminating the film according to the embodiment of the present invention on a polarizer through an adhesive or a pressure sensitive adhesive in a succeeding step. In a state in which the film according to the embodiment of the present invention is laminated on the substrate film, the film according to the embodiment of the present invention can be appropriately stretched with the substrate film and thus optical properties and mechanical properties can be adjusted.

<Laminate>

The substrate on which the film according to the embodiment of the present invention is applied is constituted of at least a substrate and the film according to the embodiment of the present invention and is also referred to as a laminate as an integrated one.

The laminate allows the film according to the embodiment of the present invention to be bonded with other layers and the like, particularly allows the film according to the embodiment of the present invention and a polarizer to be bonded through an adhesive layer, and allows a polarizer to be bonded with the film to obtain a polarizing plate. In the obtained polarizing plate, the substrate film can be peeled off from the film according to the embodiment of the present invention or can be used as a part of the polarizing plate as it is without peeling. From the viewpoint of reducing the thickness of the polarizing plate, it is preferable to use the film according to the embodiment of the present invention after peeling off the substrate from the film according to the embodiment of the present invention.

(Peeling Force Between Film According to Embodiment of Present Invention and Substrate Film)

In a case where the film according to the embodiment of the present invention used in the polarizing plate is formed by a coating method, the peeling force between the film according to the embodiment of the present invention and the substrate film can be controlled by adjusting the material of the film according to the embodiment of the present invention, the material of the substrate film, the internal strain of the film according to the embodiment of the present invention, and the like. The peeling force can be measured in, for example, a test of peeling off the substrate film in a direction of 90°, and the peeling force as measured at a speed of 300 mm/min is preferably 0.001 to 5 N/25 mm, more preferably 0.01 to 3 N/25 mm, and even more preferably 0.05 to 1 N/25 mm. In a case where the peeling force is 0.001 N/25 mm or more, it is possible to prevent peeling of the substrate film in steps other than the peeling step, and in a case where the peeling force is 5 N/25 mm or less, it is possible to prevent peeling failure (for example, zipping or cracking of the film) in the peeling step.

If necessary, a heat treatment step, a superheated steam contact step, an organic solvent contact step, and the like can be performed.

[Optical Film]

An optical film according to an embodiment of the present invention has the film according to the embodiment of the present invention. The optical film may include only the film according to the embodiment of the present invention or may include the film according to the embodiment of the present invention and other members. As the optical film, a polarizing plate protective film, a low moisture permeable film, an optically anisotropic film, an optically isotropic film, and the like may be exemplified.

[Polarizing Plate]

A polarizing plate according to an embodiment of the present invention has at least a polarizer, an adhesive layer, and the optical film according to the embodiment of the present invention in this order.

(Polarizer)

Examples of the polarizer include an iodine-based polarizer and a dye-based polarizer using a dichroic dye a polarizer. The iodine-based polarizer and the dye-based polarizer may generally be produced using a polyvinyl alcohol-based film. In the present invention, any of these polarizers may be used. For example, it is preferable that the polarizer is constituted of a polyvinyl alcohol (PVA) and a dichroic molecule. Regarding the polarizer constituted of a polyvinyl alcohol (PVA) and a dichroic molecule, for example, the description of JP2009-237376A can be referred to. The film thickness of the polarizer may be 1 to 50 µm and is preferably 2 to 30 µm and more preferably 3 to 20 µm.

(Adhesive Layer)

The adhesive layer may be formed from an adhesive. As the adhesive, an adhesive including a resin having a hydroxyl group is preferable, and in addition to a polyvinyl alcohol-based adhesive, an epoxy-based active energy ray curable adhesive, for example, an adhesive which contains an epoxy compound not including an aromatic ring in the molecule as disclosed in JP2004-245925A and is cured by heating or irradiation with an active energy ray, an active energy ray curable adhesive having (a1) a (meth)acrylic compound having two or more (meth)acryloyl groups in the molecule, (b1) a (meth)acrylic compound having a hydroxyl group in the molecule and having only one polymerizable double bond, and (c1) phenol ethylene oxide modified acrylate or nonyl phenol ethylene oxide modified acrylate in a total amount of 100 parts by mass of the (meth)acrylic compounds described in JP2008-174667A, and the like may be used. Among these, a polyvinyl alcohol-based adhesive is most preferable.

The polyvinyl alcohol-based adhesive is an adhesive including modified or unmodified polyvinyl alcohol. The polyvinyl alcohol-based adhesive may contain a crosslinking agent in addition to the modified or unmodified polyvinyl alcohol. Specific examples of the adhesive include an aqueous solution of polyvinyl alcohol or polyvinyl acetal (for example, polyvinyl butyral) and a latex of a vinyl-based polymer (for example, polyvinyl chloride, polyvinyl acetate, or polybutyl acrylate). A particularly preferable adhesive is an aqueous solution of polyvinyl alcohol. In this case, it is preferable that polyvinyl alcohol is completely saponified.

In addition, the epoxy-based active energy ray curable adhesive can be crosslinked with the copolymer (a) since the epoxy group opens by irradiation with active energy rays to produce hydroxyl groups. Therefore, in the present invention, the epoxy-based active energy ray curable adhesive is also included as a hydroxyl group containing adhesive and can be appropriately used.

The polarizing plate can be used in a display device.

[Display Device]

A display device according to an embodiment of the present invention includes the polarizing plate according to the embodiment of the present invention. The display device is not particularly limited and may be a liquid crystal display device including a liquid crystal cell, an organic EL image display device including an organic EL layer, or a plasma image display device. The polarizing plate according to the embodiment of the present invention can be arranged, for example, on the display surface side. Regarding the configuration of the display device, any configuration of a known display device can be adopted.

EXAMPLES

The present invention will be described in more detail with reference to the following Examples. The materials, amount of use, ratio, ratio, details of the treatment, procedures of the treatment, and the like shown in the following Examples can be appropriately changed without departing from the spirit of the present invention. Therefore, it is to be understood that the scope of the present invention should not be interpreted in a limited manner based on the specific examples shown below.

Synthesis Example 1

(Synthesis of Fluorine-Containing Copolymer B-1)

A 200 ml three-neck flask equipped with a stirrer, a thermometer, a reflux condenser, and a nitrogen gas introduction pipe was charged with 26.7 g of cyclohexanone and heated to 105° C. Next, a mixed solution of 1.4 g (3.4 mmol) of 2-(perfluorohexyl)ethyl acrylate, 0.6 g (1.6 mmol) of monomer 1, 22.2 g (73.0 mmol) of A-DCP (tricyclodecanedimethanol diacrylate), 20.0 g of cyclohexanone, and 3.25 g of "V-601" (manufactured by Wako Pure Chemical Corporation) was added dropwise at a constant rate so that the dropwise addition was completed in 120 minutes. After completion of the dropwise addition, stirring was further continued for 4 hours, and thus 65.0 g of a cyclohexanone solution of a fluorine-containing copolymer (B-1) was obtained. The weight-average molecular weight (Mw) of the fluorine-containing copolymer (B-1) was 420,000 (calculated in terms of polystyrene by gel permeation chromatography (EcoSEC HLC-8320GPC ((manufactured by Tosoh Corporation)) under the measurement conditions of a flow rate of 0.35 ml/min, and a temperature of 40° C. using tetrahydrofuran (THF) as an eluent, and columns of TSKgel SuperHZM-H, TSKgel SuperHZ4000, and TSKgel SuperHZ200 (manufactured by Tosoh Corporation)). In addition, the structure of the obtained fluorine-containing copolymer (B-1) was identified by $^{1}$H-NMR spectrum to determine the content mass ratio (compositional ratio) of each repeating unit with respect to the total mass of the copolymer.

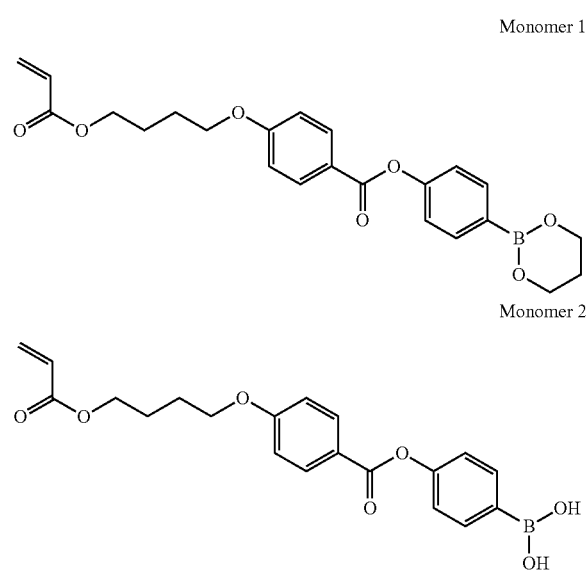

Monomer 1

Monomer 2

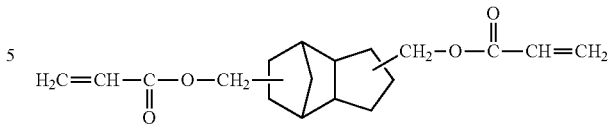

A-DCP

The fluorine-containing copolymer (B-1) includes repeating units derived from 2-(perfluorohexyl)ethyl acrylate, the monomer 1, and A-DCP, and contains 7% by mass of a repeating unit derived from 2-(perfluorohexyl)ethyl acrylate with respect to the total mass of the copolymer, 3% by mass of a repeating unit derived from the monomer 1 with respect to the total mass of the copolymer, and 90% by mass of a repeating unit derived from A-DCP with respect to the total mass of the copolymer.

Synthesis Examples 2 to 21

Fluorine-containing copolymers (B-2) to (B-21) were synthesized in the same manner as in the synthesis of the fluorine-containing copolymer (B-1) except that the kind and amount of monomers used in Synthesis Example 1 were changed, and the kind and compositional ratio (a ratio (% by mass) with respect to the total mass of the copolymer) of repeating units in the copolymer to be obtained were changed as shown in Table 1 below.

In Table 1, the kind of monomers used in the synthesis, the compositional ratio of the repeating unit derived from each monomer in the fluorine-containing copolymer, and the weight-average molecular weight (Mw) of each fluorine-containing copolymer are shown.

TABLE 1

| | Fluorine-containing copolymer | Reaping unit derived from monomer represented by Formula (I) | | Reaping unit derived from monomer having at least two polymerizable groups | | Reaping unit derived from monomer represented by Formula (III) | | Mw |
|---|---|---|---|---|---|---|---|---|
| | | Kind of corresponding monomer | % by mass | Kind of corresponding monomer | % by mass | Kind of corresponding monomer | % by mass | |
| Synthesis Example 1 | B-1 | FAAC-6 | 7 | A-DCP | 90 | Monomer 1 | 3 | 420,000 |
| Synthesis Example 2 | B-2 | FAAC-6 | 7 | A-DCP | 90 | Monomer 1 | 3 | 126,000 |
| Synthesis Example 3 | B-3 | FAAC-6 | 7 | A-DCP | 90 | Monomer 1 | 3 | 22,000 |
| Synthesis Example 4 | B-4 | FAAC-6 | 7 | A-DCP | 90 | Monomer 1 | 3 | 1,150,000 |
| Synthesis Example 5 | B-5 | FAAC-6 | 15 | A-DCP | 82 | Monomer 1 | 3 | 361,000 |
| Synthesis Example 6 | B-6 | FAAC-6 | 3 | A-DCP | 94 | Monomer 1 | 3 | 550,000 |
| Synthesis Example 7 | B-7 | FAAC-6 | 45 | A-DCP | 40 | Monomer 1 | 15 | 443,000 |
| Synthesis Example 8 | B-8 | FAAC-6 | 65 | A-DCP | 15 | Monomer 1 | 20 | 668,000 |
| Synthesis Example 9 | B-9 | FAAC-6 | 7 | A-DCP | 90 | Monomer 2 | 3 | 420,000 |
| Synthesis Example 10 | B-10 | FAAC-6 | 7 | A-DCP | 90 | Monomer 2 | 3 | 120,000 |
| Synthesis Example 11 | B-11 | FAAC-6 | 7 | A-DCP | 90 | Monomer 2 | 3 | 20,000 |
| Synthesis Example 12 | B-12 | C6F12H | 7 | A-DCP | 90 | Monomer 1 | 3 | 441,000 |
| Synthesis Example 13 | B-13 | FAAC-4 | 7 | A-DCP | 90 | Monomer 1 | 3 | 468,000 |
| Synthesis Example 14 | B-14 | FAAC-6 | 7 | AD-TMP | 90 | Monomer 1 | 3 | 471,000 |
| Synthesis Example 15 | B-15 | FAAC-6 | 7 | A-BPP-3 | 90 | Monomer 1 | 3 | 399,000 |
| Synthesis Example 16 | B-16 | FAAC-6 | 7 | A-NOD-N | 90 | Monomer 1 | 3 | 381,000 |
| Synthesis Example 17 | B-17 | FAAC-6 | 7 | A-DCP | 90 | Monomer 1 | 3 | 7,000 |
| Synthesis Example 18 | B-18 | FAVE-6 | 7 | A-DCP | 90 | Monomer 1 | 3 | 480,000 |
| Synthesis Example 19 | B-19 | FAAC-6 | 7 | DB | 90 | Monomer 1 | 3 | 399,000 |
| Synthesis Example 20 | B-20 | FAAC-6 | 7 | A-9300 | 90 | Monomer 1 | 3 | 970,000 |
| Synthesis Example 21 | B-21 | FAAC-6 | 7 | A-DCP | 90 | — | 3 | 350,000 |

The abbreviations in Table 1 mean repeating units derived from the following compounds (monomers). A-DCP, monomer-1 and monomer-2 are as described above.

FAAC-6: 2-(perfluorohexyl)ethyl acrylate
C6F12H: 2,2,3,3,4,4,5,5,6,6,7,7-dodecafluoroheptyl acrylate
FAAC-4: 2-(perfluorobutyl)ethyl acrylate
FAVE-6: 2-(perfluorohexyl)ethyl vinyl ether
AD-TMP: Ditrimethylolpropane tetraacrylate
A-BPP-3: Propoxylated bisphenol A diacrylate
A-NOD-N: 1,9-nonanediol diacrylate
DB: Divinylbenzene
A-9300: Ethoxylated isocyanuric acid triacrylate Comparative Synthesis Example 1

A comparative compound (H-1) was synthesized in the same manner as in the synthesis of the fluorine-containing copolymer (B-1) except that dicyclopentanyl methacrylate (FA-513M) was used instead of A-DCP used in Synthesis Example 1. The comparative compound (H-1) included 7% by mass of a repeating unit derived from FARC-6, 90% by mass of a repeating unit derived from FA-513M, and 3% by mass of a repeating unit derived from monomer 1, and the weight-average molecular weight was 220,000. The comparative compound (H-1) does not have a repeating unit derived from a monomer having at least two polymerizable groups.

A fluorine-containing polymer (A) was obtained according to paragraph [0109] of JP2016-150996A and was used as a comparative example compound (H-2). The comparative example compound (H-2) does not have a repeating unit derived from a monomer having at least two polymerizable groups. The weight-average molecular weight of the comparative example compound (H-2) was 15,200.

A fluorine-based polymer 1-1 was obtained according to paragraph [0159] of JP2000-102727A and was used as a comparative example compound (H-3). In the comparative example compound (H-3), the content of the repeating unit derived from the monomer having at least two polymerizable groups was 1% by mass with respect to the total mass of the comparative example compound (H-3), and the weight-average molecular weight was 12,300.

A copolymer 1 was obtained according to paragraph [0024] of JP2012-001590A and was used as a comparative example compound (H-4). In the comparative example compound (H-4), the content of the repeating unit derived from the monomer having at least two polymerizable groups was 25% by mass with respect to the total mass of the comparative example compound (H-4), and the weight-average molecular weight was 14,000.

A polymer was synthesized according to paragraph [0124] of JP2015-091927A and was used as a comparative example compound (H-5). In the comparative example compound (H-5), the content of the repeating unit derived from the monomer having at least two polymerizable groups was 1% by mass with respect to the total mass of the comparative example compound (H-5) and the weight-average molecular weight was 122,000.

<Preparation of Film Forming Composition (Coating Solution)>

Film forming compositions (coating solutions) 1 to 29 were prepared at the composition shown in Table 2. "SGP-10" in Table 2 means the following compounds.

SGP-10: Polystyrene (manufactured by PS Japan Corporation)

<Preparation of Film and Laminate>

A commercially available polyethylene terephthalate film (LUMIRROR® S105 (film thickness: 38 μm, manufactured by Toray Industries, Inc.)) was used as a substrate film, and the coating solutions 1 to 29 were used to prepare respective films 1 to 29. Specifically, each coating solution was applied to a substrate film under the condition of a conveyance speed of 60 m/min by a die coating method using the slot die described in Example 1 of JP2006-122889A and dried at 100° C. for 60 seconds. Then, the film was rolled up. In this manner, films 1 to 29, and laminates 1 to 29 in which the films 1 to 29 and the substrate film were laminated were prepared.

The solubility of the prepared coating solutions 1 to 29, the thickness of the prepared films 1 to 29, and the contact angle of water were evaluated by the following methods.

<Solubility>

10 g of each of the obtained coating solutions 1 to 29 was rolled up, put and sealed in a transparent glass vial, visually observed, and evaluated according to the following standards.

A: The solution had no turbidity at all.
B: The solution was slight cloudy but there is practically no problem.
C: The solution was cloudy or phase separation occurs.

<Film Thickness>

The film thickness of the films 1 to 29 was calculated by measuring the film thickness of each of the prepared laminates 1 to 29 using a contact-type film thickness meter and subtracting the thickness of the substrate film measured in the same manner from the above measured thickness. The film thickness of all of the films 1 to 29 was 5.0 μm.

<Contact Angle>

A 3 μL liquid droplet was made in a dry state (20° C., relative humidity: 65%) at a needle tip using a contact angle meter ["CA-X" type contact angle meter, manufactured by Kyowa Interface Science Co., Ltd.] and pure water as liquid, and the liquid droplet was brought into contact with the surface of each of the films 1 to 29 to make a liquid droplet on the films 1 to 29. The angle on a side including the liquid was measured from the angle formed between a normal line to the liquid surface and the surface of each of the films 1 to 29 at the point at which each of the films 1 to 29 and the liquid came into contact with each other in 10 seconds after the dropwise addition and considered as the contact angle. The contact angle was evaluated based on the results using the following standards.

A: The contact angle was more than 90°.
B: The contact angle was more than 70° and 90° or less.
C: The contact angle was 70° or less.

<Preparation of Polarizing Plate>

(Surface Treatment of Film)

A cellulose acetate film (FUJITAC TD40UC, manufactured by Fujifilm Corporation) was immersed in 1.5 mol/L of an aqueous solution of sodium hydroxide (saponification solution) controlled to a temperature of 37° C. for 1 minute and then the film was washed with water. Then, the film was immersed in 0.05 mol/L of an aqueous solution of sulfuric acid for 30 seconds, and further passed through a water washing bath. Then, draining with an air knife was repeated three times, water dripping was performed, and then the film was dried by being retained in a drying zone at 70° C. for 15 seconds. Thus, a cellulose acetate film which was subjected to a saponification treatment was prepared.

(Preparation of Polarizer)

According to Example 1 of JP2001-141926A, a difference in a circumferential speed was imparted to two pairs of nip rolls, stretching was performed in a longitudinal direction, and thus a polarizer having a thickness 12 μm was prepared.

(Lamination)

The polarizer obtained as described above, the laminates 1 to 29, and the cellulose acetate film which was subjected to the saponification treatment were stored in a rolled state for 3 months. Hereinafter, polarizing plates were prepared using the materials after storage. The polarizer was interposed between the laminates 1 to 29 and the cellulose acetate film which was subjected to the saponification treatment and the polarizer and the films were laminated using the following adhesive 1 in a roll-to-roil manner such that the absorption axis of the polarizer was parallel to the longitudinal direction of the laminates 1 to 29 and the cellulose acetate film which was subjected to the saponification treatment. Here, one surface of the polarizer was set such that each of the films 1 to 29 of the laminates 1 to 29 was disposed on the polarizer side and the other surface of the polarizer was the cellulose acetate film which was subjected to the saponification treatment.

Adhesive 1:

A 3% by mass aqueous solution of polyvinyl alcohol (PVA-117H, manufactured by Kuraray Co., Ltd.) was used as an adhesive.

In a case of using the adhesive 1, after lamination curing was performed at 70° C. for 20 minutes by drying.

The lamination was continued and polyethylene terephthalate as a substrate film of each of the films 1 to 29 was continuously peeled off using the same apparatus as the peeling apparatus of a separator to prepare polarizing plates 1 to 29.

<Adhesiveness>

The adhesiveness of the films 1 to 29 and the polarizer was evaluated in the following method. The surface of the polarizing plate having the films 1 to 29 laminated thereon was laminated and fixed to the glass substrate through an acrylic pressure sensitive adhesive sheet, and then a slit was made between the films 1 to 29 and the polarizer with a cutter. The polarizer and the cellulose acetate film subjected to the saponification treatment at one end of a test piece in the longitudinal direction (one side with a width of 25 mm) were gripped using a tensile test machine RTF-1210 (manufactured by A&D Co., Ltd.) and subjected to a 90° peel test (in accordance with HS K6854-1: 1999 "Adhesives-Determination of peel strength of bonded assemblies-Part 1: 90-degree peel") wider an atmosphere of a temperature of 23° C. and a relative humidity of 60% at a crosshead speed (grip moving speed) of 300 mm/min, and the evaluation on peeling of the film and the polarizer was performed. The stress applied to peeling was evaluated based on the following standards.

A: 8.0 N/25 mm or more
B: 5.0 N/25 mm or more and less than 8.0 N/25 mm
C: 2.0 N/25 mm or more and less than 5.0 N/25 mm
D: 1.0 N/25 mm or more and less than 2.0 N/25 mm
E: Less than 1.0 N/25 mm There is no problem in practical use in the standards A, B and C. The standards A and B are preferable and the standard A is more preferable.

TABLE 2

| | | | | Composition of coating solution | | | | | | Evaluation result | | |
| | | | | | | Fluorine-containing | | | | | | |
| | Polarizing plate | Film | Coating solution | Other resins Kind | (g) | copolymer Kind | (g) | Solvent Kind | (g) | Solubility | Contact angle | Adhesiveness |
|---|---|---|---|---|---|---|---|---|---|---|---|---|
| Example 1 | 1 | 1 | 1 | SGP-10 | 50 | B-1 | 50 | Ethyl acetate | 100 | A | A | A |
| Example 2 | 2 | 2 | 2 | SGP-10 | 50 | B-2 | 50 | Ethyl acetate | 100 | A | A | A |
| Example 3 | 3 | 3 | 3 | SGP-10 | 50 | B-3 | 50 | Ethyl acetate | 100 | A | A | B |
| Example 4 | 4 | 4 | 4 | SGP-10 | 50 | B-4 | 50 | Ethyl acetate | 100 | B | B | B |
| Example 5 | 5 | 5 | 5 | SGP-10 | 50 | B-5 | 50 | Ethyl acetate | 100 | B | A | A |
| Example 6 | 6 | 6 | 6 | SGP-10 | 50 | B-6 | 50 | Ethyl acetate | 100 | A | B | B |
| Example 7 | 7 | 7 | 7 | SGP-10 | 50 | B-7 | 50 | Ethyl acetate | 100 | B | A | A |
| Example 8 | 8 | 8 | 8 | SGP-10 | 50 | B-8 | 50 | Ethyl acetate | 100 | B | B | C |
| Example 9 | 9 | 9 | 9 | SGP-10 | 50 | B-9 | 50 | Ethyl acetate | 100 | A | A | A |
| Example 10 | 10 | 10 | 10 | SGP-10 | 50 | B-10 | 50 | Ethyl acetate | 100 | A | A | A |
| Example 11 | 11 | 11 | 11 | SGP-10 | 50 | B-11 | 50 | Ethyl acetate | 100 | A | A | B |
| Example 12 | 12 | 12 | 12 | SGP-10 | 50 | B-12 | 50 | Ethyl acetate | 100 | A | B | A |
| Example 13 | 13 | 13 | 13 | SGP-10 | 50 | B-13 | 50 | Ethyl acetate | 100 | A | B | B |
| Example 14 | 14 | 14 | 14 | SGP-10 | 50 | B-14 | 50 | Ethyl acetate | 100 | B | B | B |
| Example 15 | 15 | 15 | 15 | SGP-10 | 50 | B-15 | 50 | Ethyl acetate | 100 | B | A | A |
| Example 16 | 16 | 16 | 16 | SGP-10 | 50 | B-16 | 50 | Ethyl acetate | 100 | B | A | A |
| Example 17 | 17 | 17 | 17 | SGP-10 | 50 | B-17 | 50 | Ethyl acetate | 100 | A | B | C |
| Example 18 | 18 | 18 | 18 | — | — | B-1 | 100 | Ethyl acetate | 100 | A | B | A |
| Example 19 | 19 | 19 | 19 | SGP-10 | 50 | B-1 | 20 | Ethyl acetate | 100 | A | B | B |
| Example 20 | 20 | 20 | 20 | SGP-10 | 50 | B-18 | 50 | Ethyl acetate | 100 | B | B | B |
| Example 21 | 21 | 21 | 21 | SGP-10 | 50 | B-19 | 50 | Ethyl acetate | 100 | A | B | B |
| Example 22 | 22 | 22 | 22 | SGP-10 | 50 | B-20 | 50 | Ethyl acetate | 100 | A | A | B |
| Example 23 | 23 | 23 | 23 | SGP-10 | 50 | B-21 | 50 | Ethyl acetate | 100 | A | A | C |
| Comparative Example 1 | 24 | 24 | 24 | SGP-10 | 50 | H-1 | 50 | Ethyl acetate | 100 | A | A | D |
| Comparative Example 2 | 25 | 25 | 25 | SGP-10 | 90 | B-1 | 10 | Ethyl acetate | 100 | A | C | D |
| Comparative Example 3 | 26 | 26 | 26 | SGP-10 | 50 | H-2 | 50 | Ethyl acetate | 100 | A | B | E |
| Comparative Example 4 | 27 | 27 | 27 | SGP-10 | 50 | H-3 | 50 | Ethyl acetate | 100 | A | C | E |
| Comparative Example 5 | 28 | 28 | 28 | SGP-10 | 99 | H-4 | 1 | Ethyl acetate | 100 | A | C | E |
| Comparative Example 6 | 29 | 29 | 29 | SGP-10 | 50 | H-5 | 50 | Ethyl acetate | 100 | C | C | E |

From the results of "Solubility" in Table 2, it was found that the composition (coating solution) of the embodiment of the present invention had high solubility and excellent coating properties. In addition, from the results of "Contact angle" in Table 2, it was found that in the laminate having the film formed of the composition of the embodiment of the present invention, the copolymer (a) was unevenly distributed on the surface opposite to the surface in contact with the substrate film. Further, from the results of "Adhesiveness" in Table 2, it was found that the polarizing plate of the embodiment of the present invention had high adhesiveness between the film of the present invention and the polarizer. In a case where the copolymer (a) had the repeating unit derived from the monomer represented by Formula (III), it was found that the adhesiveness was further improved. On the other hand, in a case where the copolymer did not have the repeating unit derived from the monomer having at least two polymerizable groups (Comparative Examples 1 and 3), a case where even in the copolymer had the repeating unit derived from the monomer having at least two polymerizable groups, the content of the repeating unit was 1% by mass with respect to the total mass of the copolymer (Comparative Examples 4 and 6), or a case where the content of the copolymer with respect to the total solid content in the composition was small (Comparative Examples 2 and 5), it was found that the adhesiveness between the obtained film and the polarizer was insufficient. In a case where the content ratio of the repeating unit derived from the monomer having at least two polymerizable groups in the copolymer (a) of the present invention is 3% by mass or more, and the content of the composition is 15% by mass or more in the total solid content of the copolymer (a), it is considered that particularly excellent adhesiveness is exhibited.

According to the present invention, it is possible to provide a composition that can be produced under mild conditions and is capable of forming a film having excellent adhesiveness with other layers, films, or other articles. In addition, it is possible to provide an optical film having the film formed of the composition, a polarizing plate, a display device, and a method for producing the composition.

While the present invention has been described with reference to the detailed or specific embodiments, those skilled in the art will recognize that various changes or modifications can be made without departing from the spirit and scope of the present invention.

What is claimed is:

1. A composition comprising:
   a fluorine-containing copolymer comprising a repeating unit derived from a fluorine-containing monomer represented by the following formula (I) and a repeating unit derived from a monomer having at least two polymerizable groups,
   wherein a content of the repeating unit derived from a monomer having at least two polymerizable groups is 3% by mass or more with respect to a total mass of the fluorine-containing copolymer, and
   a content of the fluorine-containing copolymer is 15% by mass or more with respect to a total solid content in the composition,

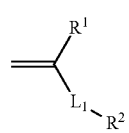

(I)

wherein, in the formula (I), $R^1$ represents a hydrogen atom or an alkyl group having 1 to 20 carbon atoms; $R^2$ represents a group having at least one fluorine atom; and $L_1$ represents a divalent linking group comprising at least one selected from the group consisting of —O—, —(C=O)O—, —O(C=O)—, —(C=O)NH—, —NH(C=O)—, a divalent aromatic group which may have a substituent, a divalent aliphatic chain group which may have a substituent, and a divalent aliphatic cyclic group which may have a substituent, wherein the fluorine-containing copolymer further comprises a repeating unit derived from a monomer represented by the following formula (III),

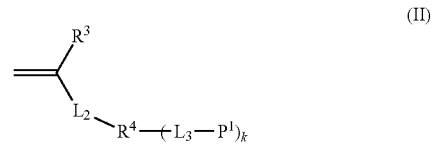

(II)

wherein, in the formula (III), $R^{10}$ represents a hydrogen atom or an alkyl group having 1 to 20 carbon atoms; $R^{11}$ and $R^{12}$ each independently represent a hydrogen atom, an aliphatic hydrocarbon group which may have a substituent, an aryl group which may have a substituent, or a heteroaryl group which may have a substituent; $R^{11}$ and $R^{12}$ may be linked to each other; and $X^1$ represents a divalent linking group, wherein a content of the repeating unit derived from the monomer represented by the formula (III) in the fluorine-containing copolymer is 0.5% to 15% by mass with respect to the total mass of the fluorine-containing copolymer, wherein the fluorine-containing monomer represented by the formula (I) is a fluorine-containing monomer represented by the following formula (IV),

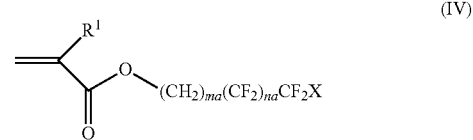

(IV)

wherein, in the formula (IV), $R^1$ represents a hydrogen atom or an alkyl group having 1 to 20 carbon atoms; ma and na each independently represent an integer of 1 to 20; and X represents a hydrogen atom or a fluorine atom, and wherein the monomer having at least two polymerizable groups is a monomer represented by the following formula (II),

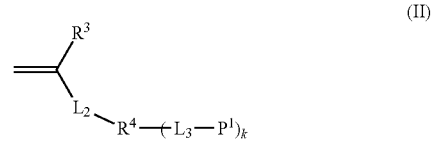

(II)

wherein, in the formula (II), $R^3$ represents a hydrogen atom or an alkyl group having 1 to 20 carbon atoms; $L_2$ represents a divalent linking group comprising at least one selected from the group consisting of —O—, —(C=O)O—, —O(C=O)—, —(C=O)NH—, —NH(C=O)—, a divalent aromatic group which may have a substituent, a divalent aliphatic chain group which may have a substituent, and a divalent aliphatic cyclic group which may have a substituent; $R^4$ represents a linking group including an aliphatic cyclic group; k represents an integer of 1 to 7; $L_3$ represents a single bond or a divalent linking group; $P^1$ represents a vinyl group, a vinyl ether group, an acryloyl group, a methacryloyl group, an acrylamide group, a methacrylamide group, or a styryl group; and in a case where k represents an integer of 2 or greater, a plurality of $L_3$'s may be the same as or different from each other, and a plurality of $P^1$'s may be the same as or different from each other.

2. The composition according to claim 1,
wherein a weight-average molecular weight of the fluorine-containing copolymer is 20,000 or more.

3. The composition according to claim 2,
wherein the content of the repeating unit derived from a monomer having at least two polymerizable groups is 30% by mass or more with respect to the total mass of the fluorine-containing copolymer.

4. The composition according to claim 1,
wherein the content of the repeating unit derived from a monomer having at least two polymerizable groups is 30% by mass or more with respect to the total mass of the fluorine-containing copolymer.

5. The composition according to claim 1,
wherein the ma represents 1 or 2, and the na represents an integer of 1 to 6.

6. An optical film comprising:
a film formed of the composition according to claim 1.

7. A polarizing plate comprising, in the following order:
a polarizer;
an adhesive layer; and
the optical film according to claim 6.

8. The polarizing plate according to claim 7,
wherein the adhesive layer contains a resin having a hydroxyl group.

9. A display device comprising:
the polarizing plate according to claim 7.

10. The composition according to claim 1,
wherein a content of the repeating unit derived from the fluorine-containing monomer represented by the formula (I) in the fluorine-containing copolymer is 1% to 65% by mass with respect to the total mass of the fluorine-containing copolymer.

11. A method for producing a composition comprising:
obtaining a fluorine-containing copolymer by polymerizing a fluorine-containing monomer represented by the following formula (I) and a monomer having at least two polymerizable groups; and
producing a composition containing the fluorine-containing copolymer,
wherein a content of the repeating unit derived from a monomer having at least two polymerizable groups is 3% by mass or more with respect to a total mass of the fluorine-containing copolymer, and
a content of the fluorine-containing copolymer is 15% by mass or more with respect to a total solid content in the composition,

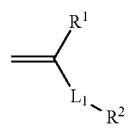
(I)

wherein, in the formula (I), $R^1$ represents a hydrogen atom or an alkyl group having 1 to 20 carbon atoms; $R^2$ represents a group having at least one fluorine atom; and $L_1$ represents a divalent linking group comprising at least one selected from the group consisting of —O—, —(C=O)O—, —O(C=O)—, —(C=O)NH—, —NH(C=O)—, a divalent aromatic group which may have a substituent, a divalent aliphatic chain group which may have a substituent, and a divalent aliphatic cyclic group which may have a substituent,
wherein the fluorine-containing copolymer further comprises a repeating unit derived from a monomer represented by the following formula (III),

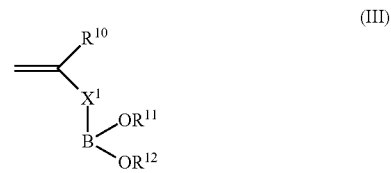
(III)

wherein, in the formula (III), $R^{10}$ represents a hydrogen atom or an alkyl group having 1 to 20 carbon atoms; $R^{11}$ and $R^{12}$ each independently represent a hydrogen atom, an aliphatic hydrocarbon group which may have a substituent, an aryl group which may have a substituent, or a heteroaryl group which may have a substituent; $R^{11}$ and $R^{12}$ may be linked to each other; and $X^1$ represents a divalent linking group,
wherein a content of the repeating unit derived from the monomer represented by the formula (III) in the fluorine-containing copolymer is 0.5% to 15% by mass with respect to the total mass of the fluorine-containing copolymer,
wherein the fluorine-containing monomer represented by the formula (I) is a fluorine-containing monomer represented by the following formula (IV),

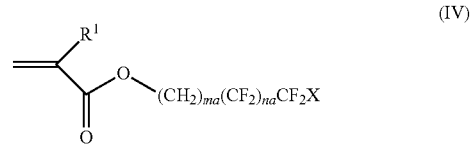
(IV)

wherein, in the formula (IV), $R^1$ represents a hydrogen atom or an alkyl group having 1 to 20 carbon atoms; ma and na each independently represent an integer of 1 to 20; and X represents a hydrogen atom or a fluorine atom, and
wherein the monomer having at least two polymerizable groups is a monomer represented by the following formula (II),

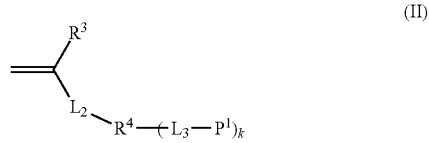
(II)

wherein, in the formula (II), $R^3$ represents a hydrogen atom or an alkyl group having 1 to 20 carbon atoms; $L_2$ represents a divalent linking group comprising at least one selected from the group consisting of —O—, —(C=O)O—, —O(C=O)—, —(C=O)NH—, —NH(C=O)—, a divalent aromatic group which may have a substituent, a divalent aliphatic chain group which may have a substituent, and a divalent aliphatic cyclic group which may have a substituent; $R^4$ represents a linking group including an aliphatic cyclic group; k represents an integer of 1 to 7; $L_3$ represents a single bond or a divalent linking group; $P^1$ represents a vinyl group, a vinyl ether group, an acryloyl group, a methacryloyl group, an acrylamide group, a methacrylamide group, or a styryl group; and in a case where k represents an integer of 2 or greater, a plurality of $L_3$'s may be the same as or different from each other, and a plurality of $P^1$'s may be the same as or different from each other.

12. The method for producing a composition according to claim 11,
wherein a content of the repeating unit derived from the fluorine-containing monomer represented by the formula (I) in the fluorine-containing copolymer is 1% to 65% by mass with respect to the total mass of the fluorine-containing copolymer.

* * * * *